United States Patent
Lee

(10) Patent No.: US 11,738,802 B2
(45) Date of Patent: Aug. 29, 2023

(54) STEERING CONTROL SYSTEM AND CONTROL METHOD THEREOF

(71) Applicant: HL MANDO CORPORATION, Gyeonggi-do (KR)

(72) Inventor: Kwanghyung Lee, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 179 days.

(21) Appl. No.: 16/657,991

(22) Filed: Oct. 18, 2019

(65) Prior Publication Data
US 2020/0198699 A1 Jun. 25, 2020

(30) Foreign Application Priority Data

Dec. 20, 2018 (KR) .................. 10-2018-0166102
Jan. 30, 2019 (KR) .................. 10-2019-0011722
Feb. 1, 2019 (KR) .................. 10-2019-0013367

(51) Int. Cl.
| | | |
|---|---|---|
| *B62D 6/04* | (2006.01) | |
| *B62D 1/26* | (2006.01) | |
| *B62D 5/04* | (2006.01) | |
| *G05D 1/02* | (2020.01) | |
| *B62D 6/00* | (2006.01) | |

(52) U.S. Cl.
CPC .............. *B62D 6/04* (2013.01); *B62D 1/265* (2013.01); *B62D 5/0463* (2013.01); *G05D 1/0285* (2013.01); *B62D 6/002* (2013.01)

(58) Field of Classification Search
CPC ........ B62D 6/04; B62D 1/265; B62D 5/0463; B62D 6/002; G05D 1/0285
See application file for complete search history.

(56) References Cited

U.S. PATENT DOCUMENTS

| | | | |
|---|---|---|---|
| 6,262,657 B1* | 7/2001 | Okuda | B60K 28/066 340/439 |
| 2010/0268422 A1* | 10/2010 | Blommer | B62D 6/008 701/44 |
| 2015/0169311 A1 | 6/2015 | Dickerson et al. | |
| 2017/0088175 A1* | 3/2017 | Okuda | B62D 6/00 |
| 2017/0158228 A1* | 6/2017 | She | B62D 5/0463 |
| 2018/0036877 A1* | 2/2018 | Kamikawa | A61B 90/00 |

(Continued)

FOREIGN PATENT DOCUMENTS

| | | |
|---|---|---|
| EP | 2 933 169 | 10/2015 |
| JP | 2002264832 A * | 9/2002 |

(Continued)

OTHER PUBLICATIONS

Izumitani Yoshiaki, electric power steering device, Mar. 6, 2001 (Year: 2001).*

(Continued)

*Primary Examiner* — Nicholas Kiswanto
*Assistant Examiner* — Jamal A Shah
(74) *Attorney, Agent, or Firm* — Ladas & Parry, LLP

(57) ABSTRACT

Provided are a steering control system and method. The steering control system includes a control unit configured to perform steering control using a steering torque and a steering angle detected by a steering torque sensor and a steering angle sensor of a vehicle, wherein the control unit performs the steering control in consideration that the steering torque or the steering angle is changeable by a disturbance.

18 Claims, 21 Drawing Sheets

(56) References Cited

U.S. PATENT DOCUMENTS

2018/0345978 A1* 12/2018 Fujii ............... B60W 30/18163
2019/0111965 A1* 4/2019 Matsumura ............ B62D 5/083
2020/0202645 A1* 6/2020 Gintz ................... G07C 5/0808

FOREIGN PATENT DOCUMENTS

| JP | 2015-229380 | 12/2015 |
| JP | 2017-149186 | 8/2017 |
| KR | 10-1675869 | 11/2016 |

OTHER PUBLICATIONS

Extended European Search Report dated Apr. 14, 2020 for European Patent Application No. 19209632,9.

* cited by examiner

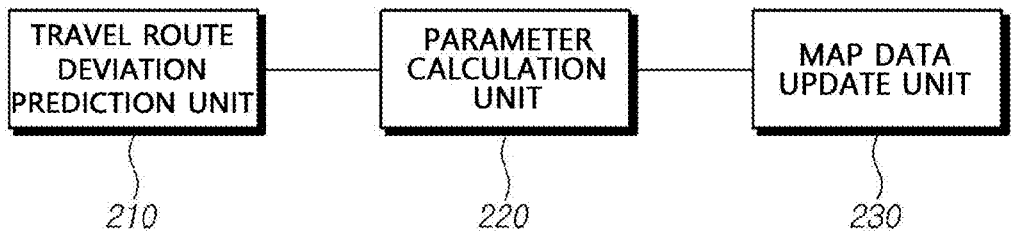

FIG. 6

| TRAVEL MAP DATA | ROAD MAP DATA | | |
|---|---|---|---|
| VEHICLE | TRAVEL ROAD A | TRAVEL ROAD B | ... |
| SPECIFICATIONS (V1) | CURVATURE (A1) | CURVATURE (B1) | |
| ALLOWABLE SPEED (V2) | ROAD SURFACE STATES (A2) | ROAD SURFACE STATES (B2) | |
| ABNORMAL MAXIMUM TORQUE (V3) | SPEED LIMIT (A3) | SPEED LIMIT (B3) | |
| ABNORMAL MAXIMUM STEERING ANGLE (V4) | ROAD WIDTH (A4) | ROAD WIDTH (B4) | |
| BOOSTED MAXIMUM TORQUE (V5) | ALLOWABLE TORQUE (A5) | ALLOWABLE TORQUE (B5) | ... |
| BOOSTED MAXIMUM STEERING ANGLE (V6) | ALLOWABLE STEERING ANGLE (A6) | ALLOWABLE STEERING ANGLE (B6) | |
| VEHICLE EXTERIOR TEMPERATURE (V7) | FIRST ROTATION SPEED (A7) | FIRST ROTATION SPEED (B7) | |
| TRAVELED DISTANCE (V8) | SECOND ROTATION SPEED (A8) | SECOND ROTATION SPEED (B8) | |
| BRAKING DISTANCE RELATIVE TO SPEED (V9) | | | |
| TIRE STATE (V10) | | | |
| TIRE PERFORMANCE GUARANTEED DISTANCE (V11) | ⋮ | ⋮ | |
| ⋮ | | | |

FIG. 7

| TRAVEL MAP DATA | | ROAD MAP DATA | | |
|---|---|---|---|---|
| VEHICLE | TRAVEL ROAD A | | TRAVEL ROAD B | ⋮ |
| SPECIFICATIONS (V1)<br>ALLOWABLE SPEED (V2)<br>ABNORMAL MAXIMUM TORQUE (V3)<br>ABNORMAL MAXIMUM STEERING ANGLE (V4)<br>BOOSTED MAXIMUM TORQUE (V5)<br>BOOSTED MAXIMUM STEERING ANGLE (V6)<br>VEHICLE EXTERIOR TEMPERATURE (V7)<br>TRAVELED DISTANCE (V8)<br>BRAKING DISTANCE RELATIVE TO SPEED (V9)<br>TIRE STATE (V10)<br>TIRE PERFORMANCE GUARANTEED DISTANCE (V11) | CURVATURE (A1)<br>ROAD SURFACE STATES (A2)<br>SPEED LIMIT (A3)<br>ROAD WIDTH (A4)<br>ALLOWABLE TORQUE (A5)<br>ALLOWABLE STEERING ANGLE (A6)<br>FIRST ROTATION SPEED (A7) ADJUSTED<br>SECOND ROTATION SPEED (A8) ADJUSTED<br>CORRECTED TORQUE (A9)<br>CORRECTED STEERING ANGLE (A10)<br>FIRST ALTERNATIVE LATERAL ACCELERATION PARAMETERS (A11)<br>SECOND ALTERNATIVE LATERAL ACCELERATION PARAMETERS (A12)<br>⋮ | | CURVATURE (B1)<br>ROAD SURFACE STATES (B2)<br>SPEED LIMIT (B3)<br>ROAD WIDTH (B4)<br>ALLOWABLE TORQUE (B5)<br>ALLOWABLE STEERING ANGLE (B6)<br>FIRST ROTATION SPEED (B7)<br>SECOND ROTATION SPEED (B8) | ⋮ |

FIG. 13

STEERING CONTROL SYSTEM AND CONTROL METHOD THEREOF

CROSS-REFERENCE TO RELATED APPLICATION

This application claims priority to and the benefit of Korean Patent Application Nos. 2018-0166102, filed on Dec. 20, 2018, 2019-0011722, filed on Jan. 30, 2019, and 2019-0013367, filed on Feb. 1, 2019, the disclosures of which are incorporated herein by reference in their entireties.

BACKGROUND

1. Field of the Invention

The present invention relates to a steering control system and a control method thereof.

2. Discussion of Related Art

A steering control system may include a steering sensor, a control unit for generating a control signal according to a sensing value measured by the steering sensor, and a driving unit for driving steering control according to the control signal of the control unit. In this case, the steering sensor includes a steering torque sensor for sensing a steering torque and a steering angle sensor for sensing a steering angle. These sensors are also referred to as a torque angle sensor (TAS).

In particular, the TAS may be easily affected by disturbances. In this case, when the value of the TAS is abnormally changed due to a disturbance, the control unit may generate an erroneous control signal, which may cause a dangerous situation for a driver and occupants of a vehicle. In particular, when an autonomous vehicle allowing a driver's driving operation ascertains the driver's autonomous driving intention by using only a steering torque sensor, the abnormal change of the steering torque sensor may cause a serious danger to the driver and the occupants of the vehicle.

On the other hand, since a fully autonomous vehicle or an unmanned autonomous vehicle does not depend on the driver's driving, the autonomous vehicle generally runs using previously stored driving data, map data, and the like.

Therefore, accurate determination or control cannot be properly performed on a driving environment different from previously stored data when a vehicle actually runs autonomously.

In addition, when a vehicle breaks down during autonomous driving, there are vehicle control techniques corresponding to the causes of the breakdown after the breakdown. However, since such techniques are for post-processing after the breakdowns, it is difficult to predict and cope with risks in advance.

Accordingly, there is a need for a technique capable of predicting breakdowns that may occur on each travel road, holding data on breakdown prevention for specific travel roads that are more likely to cause harm to a driver or an occupant when a breakdown occurs, and allowing a vehicle to more safely travel on a specific travel road in an autonomous manner.

In addition, recent automotive electrical systems inevitably lead to an increase in electronic control units (ECUs), an increase in data communication between devices, a complication of ECU-mounted software, and the like. This causes an increase in the probability of error occurrence in software.

In order to solve this problem, new vehicles such as electric vehicles tend to be released while equipped with an ECU over-the-air (OTA) function. In addition, there is a growing trend to increase the number of OEMs that require installation of an OTA function in consideration of the update and after-sales service of software.

On the other hand, the software update for ECUs of legacy vehicles having no OTA function is performed in a wired manner. This is done for each ECU and thus requires huge human and material resources.

Therefore, there is a need for a solution of providing an OTA function to a legacy ECU or an ECU that does not have the OTA function.

SUMMARY OF THE INVENTION

In order to solve the problems of the related art, the present invention provides a steering control system that determines whether a steering sensor is affected by a disturbance and then performs control, and a control method thereof.

Also, the present invention provides a steering control system that provides map data set in preparation for a situation that may cause a vehicle to break down on a specific travel road section, and a control method thereof.

Also, the present invention provides a steering control system that controls a vehicle to more safely travel in preparation for an obstacle or a road surface state that cannot be predicted on a travel road, and a control method thereof.

Also, the present invention provides a steering control system capable of assigning an OTA function to a legacy ECU or an ECU having no OTA function.

However, the objects of the present invention are not limited to the above-mentioned objects, and other objects not described herein will be clearly understandable by those skilled in the art from the following descriptions.

According to an aspect of the present invention, there is provided a steering control system including a control unit configured to perform steering control using a steering torque and a steering angle detected by a steering torque sensor and a steering angle sensor of a vehicle, wherein the control unit performs the steering control in consideration that the steering torque or the steering angle is changeable by a disturbance.

When it is determined that a currently detected steering torque or steering angle is changed by a disturbance, the control unit may maintain a latest steering torque or steering angle that is previously detected while there is no disturbance as the current steering torque or steering angle.

When only one of the steering torque and the steering angle is changed, the control unit may determine that the change is made by a disturbance.

When the directions of change of the steering torque and the steering angle are inconsistent with a predetermined reference direction, the control unit may determine that the change of the steering torque and the steering angle is made by a disturbance.

When the rate of change of the steering angle is not constant, the control unit may determine that the change of the steering angle is made by a disturbance.

When the number of times it is determined that the change of the steering torque or the steering angle is made by a disturbance exceeds a predetermined reference number, the control unit may perform control such that an error notification is output.

The vehicle may have an autonomous driving system, and the control unit may perform control such that steering assistance is provided according to the autonomous driving system when the steering torque and the steering angle are changed such that the directions of change of the steering torque and the steering angle are consistent with the predetermined reference direction and the rate of change of the steering angle is constant while a driver does not grip a steering wheel.

The vehicle may have an autonomous driving system and may determine whether a current location or a location of the vehicle after a certain time is in a dangerous area or in a non-dangerous area. At this time, when the steering torque and the steering angle are changed such that the directions of change of the steering torque and the steering angle are consistent with the predetermined reference direction and the rate of change of the steering angle is constant while a driver grips a steering wheel, the control unit may perform control such that steering assistance is provided according to the driver's driving operation when the vehicle is in the non-dangerous area and may perform control such that steering assistance is provided according to the autonomous driving system when the vehicle is in the dangerous area.

The vehicle may have an autonomous driving system, and the control unit may include a curved travel road ascertaining unit configured to ascertain a curved travel road using at least one of sensing data and map data; a parameter extraction unit configured to extract an alternative lateral acceleration parameter replacing a normal lateral acceleration parameter from the map data when the curved travel road is ascertained; and a steering control unit configured to generate a target output signal and output the generated target output signal to an actuator so that the steering of the vehicle on the curved travel road is controlled on the basis of the sensing data and the alternative lateral acceleration parameter.

The vehicle may have an autonomous driving system, and the steering control system may further include a map data setting device including a travel route deviation prediction unit configured to predict whether the vehicle deviates from a normal travel route on a travel road by comparing an abnormal lateral acceleration parameter estimated when the state of the vehicle is abnormal to a normal lateral acceleration parameter corresponding to when the state of the vehicle is normal; a parameter calculation unit configured to predict whether the vehicle deviates from the travel road when it is predicted that the vehicle deviates from the normal travel route and configured to calculate an alternative lateral acceleration parameter replacing the normal lateral acceleration parameter of the travel road when it is predicted that the vehicle deviates from the travel road; and a map data update unit configured to update prestored map data by applying the alternative lateral acceleration parameter to the map data.

The steering control system may further include an over-the-air (OTA) controller connected to a controller area network (CAN) gateway of the vehicle and the control unit and configured to perform a software update on the control unit in a wireless manner and bypass CAN data between the control unit and the CAN gateway.

The steering control system may further include an OTA controller connected to an on-board diagnostics (OBD) module of the vehicle which performs CAN communication with the control unit through the CAN gateway of the vehicle and configured to perform a software update on the control unit in a wireless manner.

According to another aspect of the present invention, there is provided a control method of a steering control system, the control method including (1) a detection operation for detecting a steering torque and a steering angle of a vehicle; and (2) a control operation for performing steering control using the detected steering torque and steering angle, wherein the steering control is performed in consideration that the steering torque or the steering angle is changeable by a disturbance.

When it is determined that a currently detected steering torque or steering angle is changed by a disturbance, the control method may include maintaining a latest steering torque or steering angle that is previously detected while there is no disturbance as the current steering torque or steering angle.

The control operation may include (1) determining that the change of the steering torque is made by a disturbance when any one of the steering torque and the steering angle is changed and the other is not changed; (2) determining that the change of the steering torque and the steering angle is made by a disturbance when the directions of change of the steering torque and the steering angle are inconsistent with a predetermined reference direction; and (3) determining that the change of the steering angle is made by a disturbance when the rate of change of the steering angle is not constant.

The control operation may include performing control such that an error notification is output when the number of times it is determined that the change of the steering torque or the steering angle is made by a disturbance exceeds a predetermined reference number.

The vehicle may have an autonomous driving system and may determine whether a current location or a location of the vehicle after a certain time is in a dangerous area or in a non-dangerous area. The control operation may include (1) performing control such that steering assistance is provided by the autonomous driving system on the assumption that the steering torque and the steering angle are changed such that the directions of change of the steering torque and the steering angle are consistent with the predetermined reference direction and the rate of change of the steering angle is constant while a driver does not grip a steering wheel; and (2) performing control such that steering assistance is provided according to the driver's driving operation when the vehicle is located in the non-dangerous area and performing control such that steering assistance is provided by the autonomous driving system when the vehicle is located in the dangerous area on the assumption that the steering torque and the steering angle are changed such that the directions of change of the steering torque and the steering angle are consistent with the predetermined reference direction and the rate of change of the steering angle is constant while the driver grips a steering wheel.

The vehicle may have an autonomous driving system, and the control operation may include a curved travel road ascertaining operation for ascertaining a curved travel road using at least one of sensing data and map data; a parameter extraction operation for extracting an alternative lateral acceleration parameter replacing a normal lateral acceleration parameter from the map data when the curved travel road is ascertained; and a steering control operation for generating a target output signal and outputting the generated target output signal to an actuator so that the steering of the vehicle on the curved travel road is controlled on the basis of the sensing data and the alternative lateral acceleration parameter.

The vehicle may have an autonomous driving system, and the control method may further include a map data setting operation including a travel route deviation prediction operation for predicting whether the vehicle deviates from a normal travel route on a travel road by comparing an abnormal lateral acceleration parameter estimated when the state of the vehicle is abnormal to a normal lateral acceleration parameter corresponding to when the state of the vehicle is normal; a parameter calculation operation for predicting whether the vehicle deviates from the travel road when it is predicted that the vehicle deviates from the normal travel route and calculating an alternative lateral acceleration parameter replacing the normal lateral acceleration parameter of the travel road when it is predicted that the vehicle deviates from the travel road; and a map data update operation for updating prestored map data by applying the alternative lateral acceleration parameter to the map data.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a block diagram showing a map data setting device applied to the steering control system according to another embodiment of the present invention;

FIG. 7 is a diagram illustrating map data that is set according to another embodiment of the present invention;

FIG. 13 is a diagram illustrating an example of determining an allowable braking distance on the basis of map data according to another embodiment of the present invention;

DETAILED DESCRIPTION OF EXEMPLARY EMBODIMENTS

Figure 1:
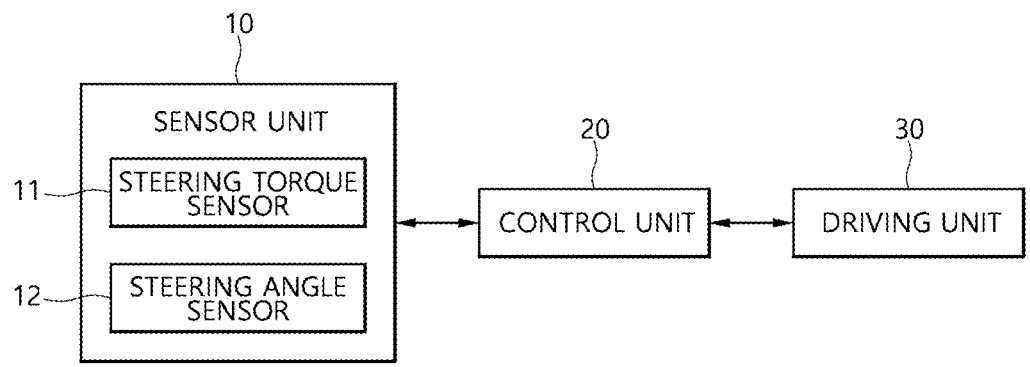
FIG. 1 shows a block diagram of a steering control system according to an embodiment of the present invention.

The above objects, means and advantages of the present invention will become more apparent from the following detailed description taken in conjunction with the accompanying drawings, and accordingly, those skilled in the art may easily implement the technical idea of the present invention. Further, in describing the present invention, when it is determined that a detailed description of the known art related to the present invention may obscure the gist of the present invention, the detailed description thereof will be omitted.

The terminology used herein is for the purpose of describing particular embodiments only and is not intended to be limiting of the present invention. In this specification, the singular forms "a," "an," and "the" are intended to include the plural forms as well, unless the context clearly indicates otherwise. In this specification, the term "comprise," "include," "provide," or "have" do not preclude the presence or addition of one or more elements other than mentioned elements.

In this specification, the term "or" or "at least one" may represent one of a plurality of words listed together or a combination of two or more. For example, the phrases "A or B" or "at least one of A and B" may include only one of A and B and may include both A and B.

In this specification, descriptions that follow "for example," etc., may not exactly match cited characteristics, variables, or presented information and would not limit the various embodiments of the present invention to effects such as deformation, including tolerances, measurement errors, and limitation of measurement accuracy and other commonly known factors.

In this specification, it will be understood that when an element is referred to as being "connected" or "coupled" to another element, it can be directly connected or coupled to the other element or intervening elements may be present. In contrast, it should be understood that when an element is referred to as being "directly connected" or "directly coupled" to another element, there are no intervening elements present.

In this specification, it will be understood that when an element is referred to as being "on" or "in contact with" another element, it can be in direct contact with or directly connected to the other element or intervening elements may be present. In contrast, it should be understood that when an element is referred to as being "directly on" or "in direct contact with" another element, there are no intervening elements present. Other expressions for describing the relationship between elements, for example, "between" and "directly between" can be interpreted in the same way.

In this specification, although the terms "first," "second," etc. may be used to describe various elements, these elements should not be limited by these terms. In addition, the above terms should not be construed as limiting the order of the elements and may be used to distinguish one element from another. For example, a first element could be termed a second element, and similarly, a second element could be termed a first element.

Unless otherwise defined, all terms used herein have the same meaning as commonly understood by one of ordinary skill in the art to which this invention belongs. Also, terms such as those defined in commonly-used dictionaries are not to be interpreted in an idealized or overly formal sense unless expressly so defined herein.

FIG. 1 shows a block diagram of a steering control system according to an embodiment of the present invention.

The steering control system according to an embodiment of the present invention is a system for controlling a traveling direction of a vehicle and may include a sensor unit 10, a control unit 20, and a driving unit 30 as shown in FIG. 1. For example, the steering control system according to an embodiment of the present invention may include an electric power steering (EPS) system, but the present invention is not limited thereto.

Figure 2:
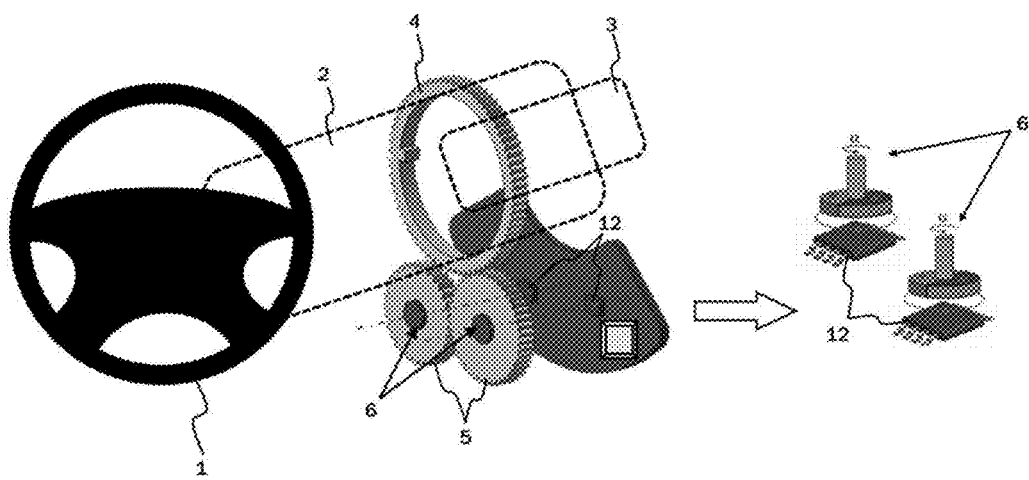
FIG. 2 briefly shows a principle in which a steering torque and a steering angle are detected in the steering control system according to an embodiment of the present invention.

FIG. 2 briefly shows a principle in which a steering torque and a steering angle are detected in the steering control system according to an embodiment of the present invention.

The sensor unit 10 senses a variety of information regarding a vehicle's current state and delivers the information to the control unit 20. The sensor unit 10 may include a steering torque sensor 11 and a steering angle sensor 12, each of which is a steering sensor.

The steering torque sensor 11 is configured to sense a generated steering torque by measuring a degree to which a torsion bar 3 connected to a steering wheel 1 is twisted along with the rotation of the steering wheel 1.

The steering angle sensor 12 is configured to sense the rotation angle of the steering wheel 1, that is, a steering angle by measuring a magnetic field that changes due to a steering magnet 6 while a column shaft 2, a steering main gear 4, a plurality of steering planetary gears 5, and the steering magnet 6 that are connected in sequence also rotate along with the rotation of the steering wheel 1, that is, by measuring the Hall effect.

The sensor unit 10 may include an acceleration sensor (not shown), a yaw rate sensor (not shown), or a speed sensor (not shown) in addition to the steering torque sensor 11 and the steering angle sensor 12.

The control unit 20 is configured to generate a control signal according to a sensing value measured by the sensor unit 10 and controls the steering control system as a whole. For example, the control unit 20 may be an electronic control unit, but the present invention is not limited thereto.

In particular, when a disturbance is generated, a steering torque and a steering angle may be changed. A control method of the control unit 20 according to the change will be described below.

The driving unit 30 is configured to actually drive steering control according to the control signal of the control unit 20.

For example, the driving unit 30 may rotate wheels in the steering direction of the steering wheel 1 according to the control signal.

Also, the driving unit 30 may drive power steering assistance according to the control signal.

Figure 3:
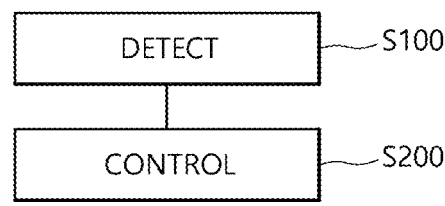
FIG. 3 shows a flowchart of a control method of the steering control system according to an embodiment of the present invention.

FIG. 3 shows a flowchart of a control method of the steering control system according to an embodiment of the present invention.

The control method of the steering control system according to an embodiment of the present invention may be performed by the control unit 20. In particular, the control method of the steering control system according to an embodiment of the present invention may include determining whether a disturbance is generated and performing steering control. To this end, as shown in FIG. 3, the method may include S100 and S200.

S100 is a detection operation and is an operation of detecting a steering torque and a steering angle sensed in the sensor unit 10.

S200 is a control operation and is an operation of performing steering control using the detected steering torque and steering angle. In particular, in S200, the steering control may be performed in consideration that the steering torque or the steering angle is changeable by a disturbance. In this case, the disturbance may be a magnetic field, an electromagnetic wave, an impact, or the like.

When a disturbance is generated, the steering torque or the steering angle may be changed while exhibiting the following characteristics.

<Characteristics of Steering Torque or Steering Angle Changed Due to Disturbance Generation>

[1] First Characteristic: Only One of the Steering Torque and the Steering Angle can be Changed.

The steering torque sensor 11 and the steering angle sensor 12 interoperate with each other through the above-described mechanical configuration to sense a steering torque and a steering angle.

Thus, when the steering torque and the steering angle are changed along with the rotation of the steering wheel 1 according to a driver's driving operation in a normal situation where no disturbance is generated (hereinafter referred to as "no disturbance"), both of the steering torque and the steering angle may be changed.

On the other hand, when a disturbance such as a magnetic field, an electromagnetic wave, or an impact is generated in the vicinity of the steering torque sensor 11 and the steering angle sensor 12, only one of the steering torque and the steering angle may be changed. That is, when only one of the steering torque and the steering angle sensed by the steering torque sensor 11 and the steering angle sensor 12 having no breakdowns is changed, this may be considered as being caused by a disturbance.

In consideration of the first characteristic, when only one of the steering torque and the steering angle is changed, that is, when the steering torque is changed but the steering angle is not changed or when the steering torque is not changed but the steering angle is changed, S200 may include determining that the change is caused by a disturbance. In particular, when the steering torque is changed but the steering angle is not changed, S200 may include determining that the change of the steering torque is generated by a disturbance such as an impact on a wheel, etc.

Meanwhile, S200 may include determining whether a change is made by comparing a previously sampled steering angle to a currently sampled steering angle. However, the sampled steering angle may have an error in itself. Thus, S200 may include determining that a change is made when the difference between the previous steering angle and the current steering angle is within a predetermined changeability range and determining that no change is made when the difference is within a predetermined unchangeability range.

Also, S200 may include determining whether a change is made by using a currently sampled steering torque. That is, when the steering torque is changed upon no disturbance, the control unit 20 immediately drives the driving unit 30 to rotate wheels such that the steering torque becomes zero. As a result, the previous steering torque upon no disturbance has a value of zero. However, the sampled steering torque may have an error in itself. Thus, S200 may include determining that a change is made when the current steering torque is within a predetermined changeability range and determining that no change is made when the current steering torque is within a predetermined unchangeability range.

[2] Second Characteristic: The Directions of Change of the Steering Torque and the Steering Angle May be Inconsistent.

Since the steering torque sensor 11 and the steering angle sensor 12 interoperate with each other, the direction in which the torsion bar 3 is twisted along with the rotation of the steering wheel 1 and the direction in which the steering planetary gear 5 is rotated along with the rotation of the steering wheel 1 are consistent.

Thus, when the steering torque and the steering angle are changed along with the rotation of the steering wheel 1 according to a driver's driving operation upon no disturbance, the directions of change of the steering torque and the steering angle may be consistent.

On the other hand, when a disturbance such as a magnetic field or an electromagnetic wave is generated in the vicinity of the steering torque sensor 11 and the steering angle sensor 12, the directions of change of the steering torque and the steering angle may be inconsistent. That is, when the directions of change of the steering torque and the steering angle sensed by the steering torque sensor 11 and the steering angle sensor 12 having no breakdowns are inconsistent, this may be considered as being caused by a disturbance.

In consideration of the second characteristic, when the steering torque and the steering angle are changed such that the directions of change of the steering torque and the steering angle are inconsistent with a predetermined reference direction, S200 may include determining that the change of the steering torque and the steering angle is made by a disturbance such as a magnetic field or an electromagnetic wave.

[3] Third Characteristic: The Rate of Change of the Steering Angle May not be Constant.

The steering angle sensor 12 senses a steering angle along with the rotation of the steering planetary gear 5. In this case, the teeth of the steering planetary gear 5 are spaced at regular intervals. Thus, when the steering wheel 1 is rotated according to a driver's driving operation upon no disturbance, the steering angle may be changed at a regular rate of change because the steering planetary gear 5 is rotated in engagement with the teeth of the steering planetary gear 5.

On the other hand, when a magnetic field disturbance is generated in the vicinity of the steering angle sensor 12, the rate of change of the steering angle is not constant. This is because the strength of the magnetic field changes nonlinearly with respect to a distance. That is, the magnetic field disturbance is very unlikely to be generated at a constant size, and the rate of change of the steering angle caused by the magnetic field disturbance is not usually constant.

In consideration of the third characteristic, when the steering torque and the steering angle are changed such that the directions of change of the steering torque and the steering angle are consistent with a predetermined reference direction and the rate of change of the steering angle is not constant (i.e., within a predetermined reference rate range), S200 may include determining that the change of the steering angle is made by a disturbance such as a magnetic field or the like.

Meanwhile, when it is determined that the steering torque or the steering angle is changed by a disturbance, steering control should not be performed according to the changed steering torque or the steering angle, and previously performed steering control should be maintained. In consideration of the above description, when it is determined that a currently sampled and detected steering torque or steering angle is changed by a disturbance, S200 may include maintaining the previously sampled and detected latest steering torque or steering angle upon no disturbance as the currently detected value.

Also, S200 may include increasing a count indicating the number of times it is determined that the change of the steering torque or the steering angle is made by a disturbance. In this case, when the increased disturbance determination count exceeds a predetermined reference number, S200 may include performing control such that an error notification is output. However, the number of times may be counted within a predetermined reference time.

In particular, the steering control system according to an embodiment of the present invention may be applied to an autonomous vehicle by employing an autonomous driving system. In this case, the driving and steering of the vehicle may be selectively controlled according to the autonomous driving system or a driver's driving operation.

When the driver does not grip the steering wheel 1 (i.e., the driver is not willing to drive at all) while the first to third characteristics are not exhibited by a disturbance, the control unit 20 may control the driving unit 30 to follow the steering assistance of the autonomous driving system. In consideration of the above description, when the steering torque and the steering angle are changed such that the directions of change of the steering torque and the steering angle are consistent with a predetermined reference direction and the rate of change of the steering angle is constant while the driver does not grip the steering wheel 1, S200 may include performing control such that steering assistance is provided according to the autonomous driving system. Here, the steering torque sensor may be excluded, and a disturbance may be determined using an angle-only sensor (AOS). Thus, the control may be performed such that the steering assistance is provided according to the autonomous driving system.

In the case of an autonomous vehicle, the steering control system may determine whether the current location of the vehicle or the location to be reached after a certain time is in a dangerous area or a non-dangerous area on the basis of current travel conditions or changed travel conditions. Here, the term "dangerous area" refers to an area where a dangerous situation may occur or an area where a dangerous situation is likely to occur, for example, an area where the vehicle collides with a nearby vehicle, object, or the like or changes lanes when the steering is controlled according to the current or changed steering torque and steering angle. Also, the term "non-dangerous area" refers to an area where a dangerous situation cannot occur or an area where a dangerous situation is less likely to occur, for example, an area where the vehicle is unlikely to collide with a nearby vehicle, object, or the like or keep the lane although the steering is controlled according to the current or changed steering torque and steering angle.

When the driver grips the steering wheel 1 (i.e., the driver is willing to drive) while the first to third characteristics are not exhibited by a disturbance, the control unit 20 may selectively perform two types of control. That is, when the vehicle is located in the non-dangerous area, the control unit 20 may perform control such that the steering assistance is provided according to the driver's driving operation. On the contrary, when the vehicle is located in the dangerous area, the control unit 20 may perform control such that the steering assistance is provided according to the autonomous driving system.

In consideration of the above description, when the steering torque and the steering angle are changed such that the directions of change of the steering torque and the steering angle are consistent with a predetermined reference direction and the rate of change of the steering angle is constant while the driver grips the steering wheel 1, S200 may include performing control such that steering assistance is provided according to the driver's driving operation when the vehicle is in the non-dangerous area and performing control such that steering assistance is provided according to the autonomous driving system when the vehicle is in the dangerous area.

Figure 4:
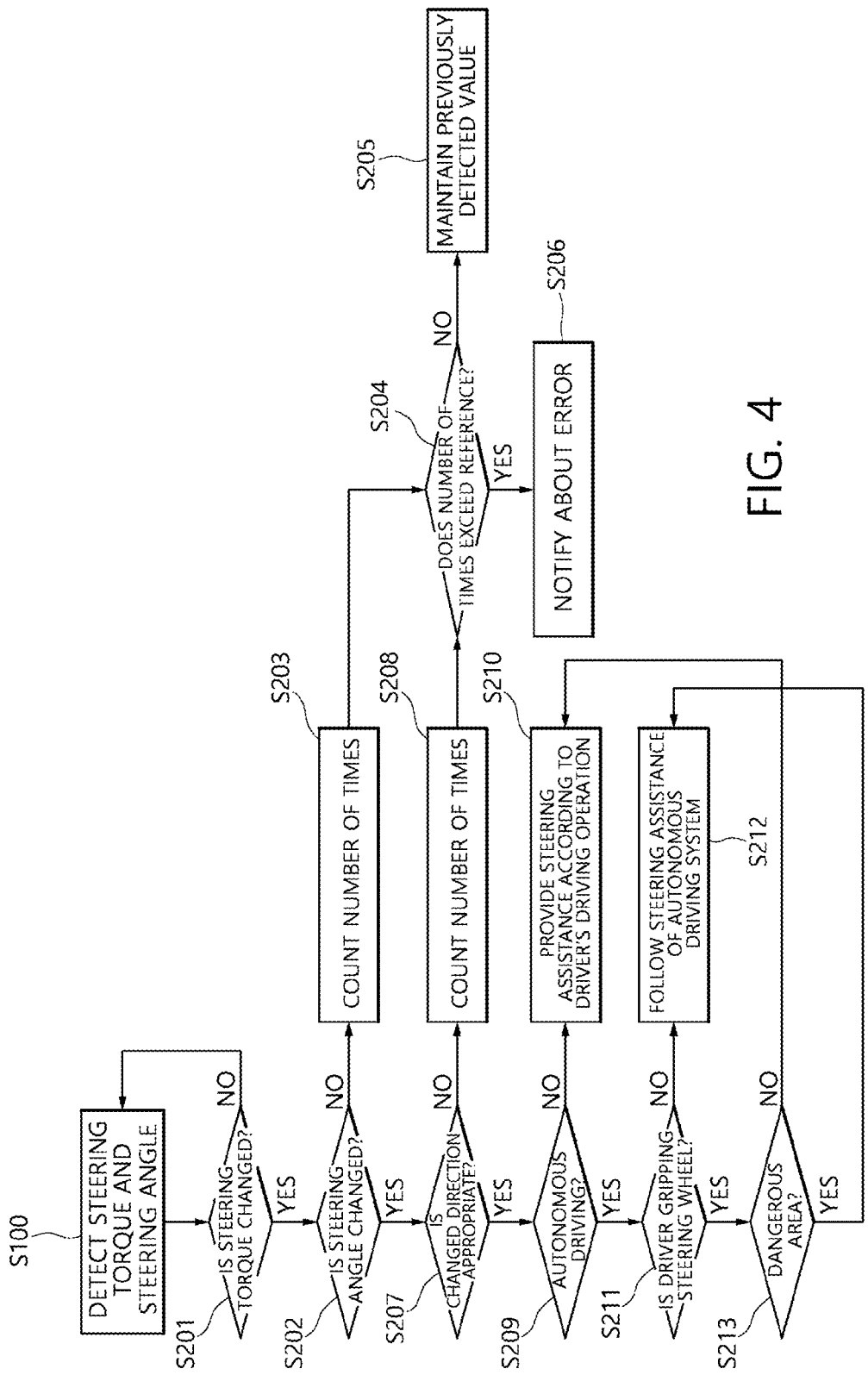
FIG. 4 shows a more detailed flowchart of the control method of the steering control system according to an embodiment of the present invention.

FIG. 4 shows a more detailed flowchart of the control method of the steering control system according to an embodiment of the present invention.

In consideration of the first to third characteristics and the description of when the autonomous driving system is applied to the vehicle, an example sequence of the control method of the steering control system according to an embodiment of the present invention may be illustrated as shown in FIG. 4.

That is, referring to FIG. 4, the steering control system detects a steering torque and a steering angle (S100). The steering control system determines whether a currently detected steering torque is changed (S201), and performs S202 when the steering torque is changed. When the steering torque is not changed, the processing returns to S100.

Subsequently, the steering control system determines whether a currently detected steering angle is changed (S202), and performs S207 when the steering angle is changed. When the steering angle is not changed, this means that only the steering torque is changed. Thus, the steering control system determines that the change is made by a disturbance and then increases a disturbance determination count (S203). In this case, the steering control system determines whether the disturbance determination count exceeds a predetermined reference number (S204), and performs control such that an error notification is output when the disturbance determination count exceeds the reference number (S206). On the other hand, when the disturbance determination count does not exceed the predetermined reference number, the steering control system performs control such that the previously detected latest steering torque or steering angle upon no disturbance is maintained as a currently detected value (S205).

In particular, S202 may include determining whether the rate of change of the steering angle is constant as well as whether the currently detected steering angle is changed. That is, S207 may be performed only when the steering angle is changed in S202 and also the rate of change of the steering angle is within a predetermined rate range.

When both of the steering torque and the steering angle are changed such that the rate of change of the steering angle is constant, the steering control system determines whether the direction of change thereof is appropriate (S207). When the direction of change is appropriate (that is, consistent with a predetermined reference direction), the steering control system performs S209. On the other hand, when the direction of change is not appropriate, the steering control system determines that the change is made by a disturbance and increases a disturbance determination count (S203). In this case, the steering control system determines whether the disturbance determination count exceeds a predetermined reference number (S204), and performs control such that an error notification is output when the disturbance determination count exceeds the reference number (S206).

When both of the steering torque and the steering angle are changed such that the rate of change of the steering angle is constant and the directions of change of the steering torque and the steering angle are appropriate, the steering control system determines whether the vehicle travels autonomously (S209). When the vehicle does not travel autonomously, the steering control system performs control such that steering assistance is provided according to the driver's driving operation (S210).

When the vehicle travels autonomously, the steering control system determines whether the driver grips the steering wheel 1 (i.e., whether the driver is willing to drive) (S211). When the driver does not grip the steering wheel 1 (i.e., the driver is not willing to drive), the steering control system performs control such that steering assistance is provided according to the autonomous driving system (S212).

Meanwhile, when the steering torque and the steering angle are changed such that the rate of change of the steering angle is constant and the directions of change of the steering torque and the steering angle are consistent with a predetermined reference direction while the driver grips the steering wheel, the steering control system determines whether the vehicle is located in the dangerous area (S213).

When the vehicle is located in the non-dangerous area, the steering control system performs control such that steering assistance is provided according to the driver's driving operation (S210). On the other hand, when the vehicle is located in the dangerous area, the steering control system performs control such that steering assistance is provided according to the autonomous driving system (S212).

A steering control system and method according to another embodiment of the present invention will be described below with reference to FIGS. 5 to 21.

Figure 5:
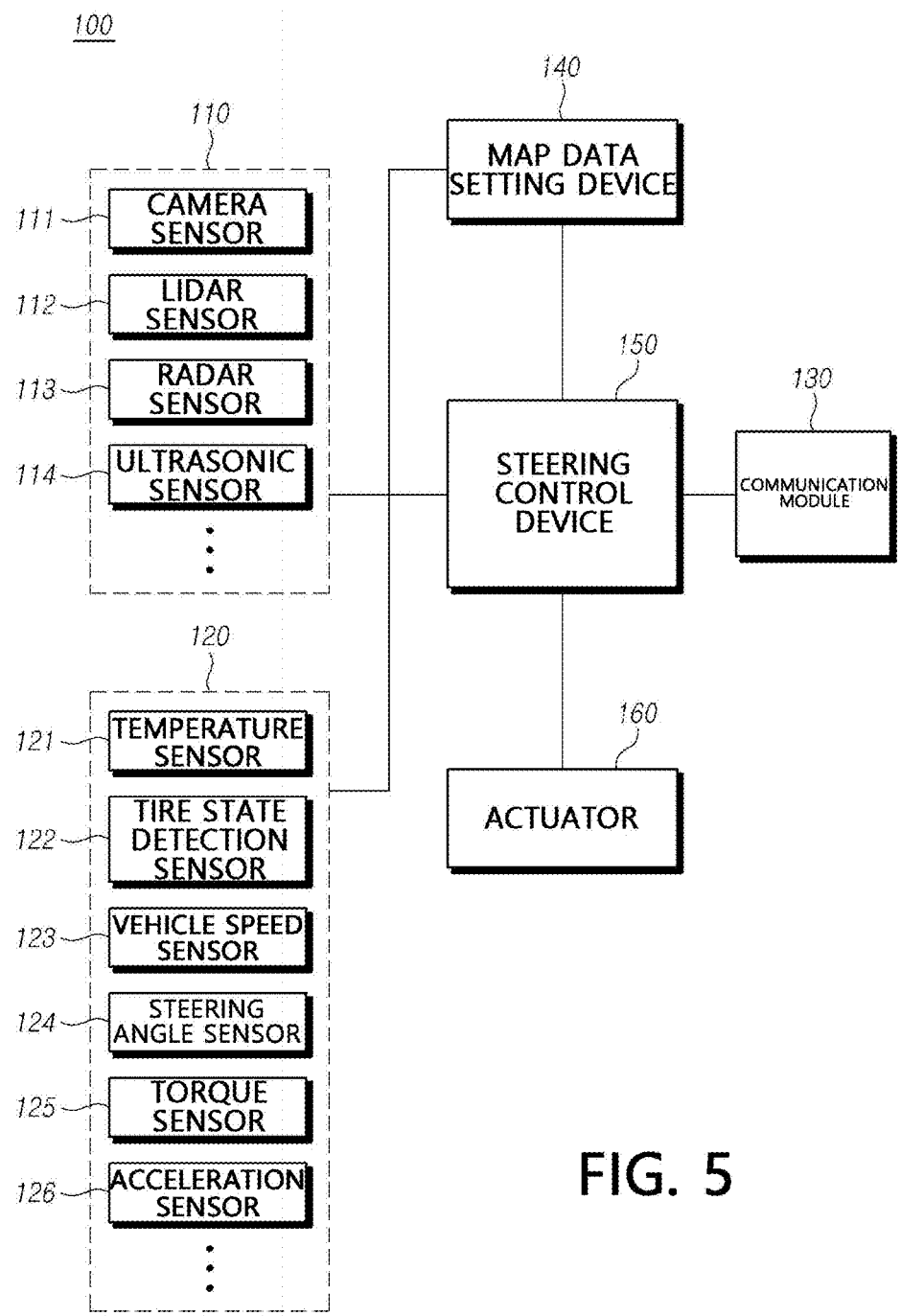
FIG. 5 is a block diagram schematically showing a steering control system according to another embodiment of the present invention.

FIG. 5 is a block diagram schematically showing a steering control system 100 according to another embodiment of the present invention.

Referring to FIG. 5, the steering control system 100 according to another embodiment of the present invention may control the steering of a vehicle when the vehicle travels entirely autonomously or when the vehicle is driven by a driver by default but is assisted by autonomous driving.

The steering control system 100 may include a vehicle exterior sensor 110, a vehicle detection sensor 120, a communication module 130, a map data setting device 140, a steering control device 150, an actuator 160, and the like.

Here, it can be understood that the steering control system 100 partially has the same elements as the steering control system shown in FIG. 1. As an example, it can be understood that the vehicle exterior sensor 110 and the vehicle detection sensor 120 correspond to the sensor unit 10 of FIG. 1 and the steering control device 150 and the actuator 160 correspond to the control unit 20 and the driving unit 30 of FIG. 1, respectively. Accordingly, it can be understood that the description of one element of the steering control system 100 may also be applied to that of a corresponding element of the steering control system of FIG. 1.

The vehicle exterior sensor 110 may include a camera sensor 111, a Lidar sensor 112, a radar sensor 113, an ultrasonic sensor 114, etc. However, the present invention is not limited thereto, and the vehicle exterior sensor 110 may include any device as long as the device can sense the surroundings of the vehicle.

The vehicle detection sensor 120 may include a temperature sensor 121, a tire state detection sensor 122, a vehicle speed sensor 123, a steering angle sensor 124, a torque sensor 125, an acceleration sensor 126, and the like. However, the present invention is not limited thereto.

The communication module 130 functions to perform communication between a vehicle and a GPS satellite, communication between vehicles, communication between a vehicle and an infrastructure, communication between a vehicle and a server, in-vehicle communication, and the like. For example, the communication module 130 may include a broadcast receiving module, a wireless Internet module, a near field communication module, a location information module, an optical communication module, a vehicle-to-everything (V2X) communication module, and the like.

The map data setting device 140 may set and store map data that is used when the vehicle travels autonomously or entirely autonomously. In detail, the map data setting device 140 may build and store data of road information, travel information computed for a vehicle to travel appropriately autonomously (or entirely autonomously) on roads, and the like.

Accordingly, the map data may include road map data indicating information on road shapes, road surface states, road curvature, speed limit on roads, road widths, and the number of lanes, and travel map data indicating information on specifications of a vehicle, an allowable speed range, an external temperature of a vehicle, a traveled distance, and tire states, etc.

Although not shown, by a navigation device included in the communication module 130 inputting information regarding all allowable roads to the map data setting device 140 directly or indirectly via the steering control device 150, the map data may be updated.

The map data setting device 140 may be disposed in a vehicle while storing map data previously generated in a manufacturing stage. Also, the map data setting device 140 may acquire a variety of new information that may be generated while the vehicle travels autonomously (or entirely autonomously), apply the information to the map data, and update and store the map data.

The steering control device 150 may receive necessary information from the vehicle exterior sensor 110, the vehicle detection sensor 120, the communication module 130, and the map data setting device 140, and the like, generate a control signal for driving the actuator 160, and output the generated control signal.

Here, the control signal may vary depending on the type of the actuator 160. For example, when the actuator 160 is a motor, the control signal may be a target output signal for generating a torque (a steering torque) due to the driving of the motor.

Meanwhile, the steering control device 150 according to another embodiment of the present invention may implement a redundant system by including two or more electronic controller units (ECUs) for outputting electrical signals to the actuator 160. Also, the steering control device 150 according to another embodiment of the present invention may perform fail-safe operation based on the redundant system.

For example, when the vehicle is abnormal, an output signal that should have been normally output from the steering control device 150 may be temporarily reduced. In this case, the steering control device 150 restores the reduced output signal to an output signal in the normal state.

As another example, when the vehicle is abnormal, the steering control device 150 may determine that the reduced output signal cannot be restored to an output signal in the normal state. In this case, the steering control device 150 maintains and outputs the reduced output signal to the actuator 160. In this case, when the steering control device 150 determines that a current situation is emergent, the steering control device 150 may boot up the reduced output signal within an allowable range.

The redundant system and the fail-safe operation based on the redundant system will be described in detail below with reference to FIG. 16.

The actuator 160 may be driven by receiving a control signal from the steering control device 150. The actuator 160 may include a steering motor, a driving motor for rotating wheels, a reaction force motor, an alarm device, and the like. However, the present invention is not limited thereto.

The steering control system 100 according to another embodiment of the present invention controls the steering of a vehicle using the map data stored in the map data setting device 140 such that the vehicle travels autonomously in a more stable manner.

Accordingly, in order for the vehicle to perform stable autonomous driving, it is necessary to appropriately set the prestored map data.

The map data setting device 140 according to another embodiment of the present invention will be described in detail below.

FIG. 6 is a diagram showing a map data setting device 200 applied to the steering control system according to another embodiment of the present invention.

Referring to FIG. 6, the map data setting device 200 applied to the steering control system according to another embodiment of the present invention may include a travel route deviation prediction unit 210, a parameter calculation unit 220, a map data update unit 230, and the like.

The travel route deviation prediction unit 210 may predict whether a vehicle deviates from a normal travel route on a travel road by comparing an abnormal lateral acceleration parameter estimated when the vehicle is abnormal to a normal lateral acceleration parameter applied when the vehicle is normal.

In detail, the travel route deviation prediction unit 210 may compute an abnormal lateral acceleration parameter and a normal lateral acceleration parameter for a travel road to be predicted on the basis of map data and may predict whether the vehicle deviates from the normal travel route on the travel road by comparing the two parameters.

Here, a lateral acceleration parameter may be a variable for representing the degree of steering capability of an autonomous vehicle and may be computed using steering information (a steering angle or a steering torque) and a travel speed of the vehicle. That is, a lateral acceleration parameter Lg may be determined by the following Equation 1:

$$Lg = v \times \theta \quad \text{[Equation 1]}$$

where v is a vehicle travel speed, and $\theta$ is a steering angle. In Equation 1, the steering angle may be replaced by a steering torque $\tau$.

Preferably, the lateral acceleration parameter Lg may be determined by multiplying the maxim vehicle travel speed by the maximum steering angle or the maximum steering torque.

Meanwhile, an abnormal lateral acceleration parameter may denote a value that is assumed in preparation for occurrence of a breakdown.

Here, the normal travel route may denote a route for guiding a vehicle's behavior such that the vehicle travels autonomously on a travel road.

In the case of an autonomous vehicle, a method of generating a normal travel route and a method of determining whether a vehicle deviates from a normal travel route using a normal lateral acceleration parameter and an abnormal lateral acceleration parameter by means of the travel route deviation prediction unit 210 will be described in detail below with reference to FIGS. 7 to 9.

When it is predicted that the vehicle deviates from the normal travel route, the parameter calculation unit 220 may predict whether the vehicle deviates from the travel road. When it is predicted that the vehicle deviates from the travel road, the parameter calculation unit 220 may calculate an alternative lateral acceleration parameter replacing the normal lateral acceleration parameter of the travel road.

In detail, the parameter calculation unit 220 predicts whether the vehicle deviates from an edge of the travel road on the basis of the map data. When it is predicted that the vehicle deviates from the edge of the travel road, the parameter calculation unit 220 may calculate an alternative lateral acceleration parameter to be used for the travel road.

Here, an alternative lateral acceleration parameter is a parameter that is used instead of a normal lateral acceleration parameter to be used when a vehicle is traveling on a specific travel road, and the alternative lateral acceleration parameter may have a size smaller than that of the normal lateral acceleration parameter and greater than that of the abnormal lateral acceleration parameter.

The purpose of calculating the alternative lateral acceleration parameter is to minimize the probability of occurrence of danger in an abnormal state or in a breakdown state when the vehicle is actually traveling.

Accordingly, when a vehicle is actually traveling on a specific travel road (e.g., a curved travel road), the vehicle may utilize the alternative lateral acceleration parameter instead of the normal lateral acceleration parameter. Thus, the vehicle may safely travel by applying the steering information and the travel speed of the vehicle corresponding to the alternative lateral acceleration parameter.

By applying the alternative lateral acceleration parameter to prestored map data, the map data update unit 230 may update the map data.

In detail, the map data update unit 230 may update the prestored map data by applying the alternative lateral acceleration parameter corresponding to a specific travel road to road data of the specific travel road included in the map data.

The map data updated and stored by the map data update unit 230 may be output to the steering control device 150.

The operations of the elements included in the map data setting device 200 may be experimentally performed during a manufacturing process or may be performed while the vehicle is traveling after the manufacturing process.

As described above, the map data setting device 200 applied to the steering control system according to another embodiment of the present invention can minimize the probability that danger will occur upon a breakdown by using travel data replacing normal travel data in preparation for a situation that may cause a vehicle to break down on a specific travel road section.

A specific embodiment in which a lateral acceleration parameter is calculated will be described below with reference to a diagram illustratively showing map data.

FIG. 7 is a diagram illustrating map data that is set according to another embodiment of the present invention.

Referring to FIG. 7, the map data according to another embodiment of the present invention may include travel map data indicating information regarding a vehicle, road map data indicating information regarding a travel road, etc.

The travel map data may include vehicle specifications, an allowable speed, an abnormal maximum torque and an abnormal maximum steering angle, a boosted maximum torque and a boosted maximum steering angle, an external temperature of a vehicle, a traveled distance, a braking distance relative to speed, tire states, a tire performance guaranteed distance, and the like. However, the present invention is not limited thereto.

The allowable speed refers to a speed ranging from a stationary state to the maximum travel speed.

The abnormal maximum torque and the abnormal maximum steering angle may refer to the maximum torque and the maximum steering angle which may be obtained when the vehicle is abnormal or broken down.

The boosted maximum steering torque and the boosted maximum steering angle may refer to the maximum steering torque and the maximum steering angle which may be obtained when the steering control device 150 that performs fail-safe operation based on the redundant system determines that a current situation is emergent and then boosts up a reduced output signal within an allowable range.

Herein, the above-described torque and steering angle may be represented as steering information. In this case, the case where the vehicle is abnormal may be the same as described above with reference to FIG. 5.

The braking distance relative to speed generally increases with an increase of speed. A vehicle has a plurality of allowable speeds, and thus a plurality of braking distances relative to speeds may be present.

Meanwhile, the road map data may include information regarding travel roads present on a map.

For example, the road map data may include the curvature, road surface states, speed limit, width, allowable torque, allowable steering angle, first rotational speed, second rotational speed, etc. of each of the travel roads. However, the present invention is not limited thereto.

The road surface states may include the material or shape of a travel road.

The allowable torque and the allowable steering angle refer to a steering torque and a steering angle which are necessary when a vehicle is normally traveling on a corresponding travel road and may preferably refer to the maximum steering torque and the maximum steering angle at which the vehicle can normally travel.

The first rotational speed and the second rotational speed may refer to the rotational speeds of a left wheel and a right wheel which is rotated by a driving motor. For example, the first rotational speed is the rotational speed of any one of at least one left wheel and at least one right wheel, and the second rotational speed is the rotational speed of the other one.

Although not shown, the speed ratio between the first rotational speed and the second rotational speed may be included in the map data. Here, the numerical formula of the speed ratio may vary depending on the shape of the curved travel road.

The travel route deviation prediction unit 210 may calculate a normal lateral acceleration parameter and an abnormal lateral acceleration parameter on the basis of the map data.

In the case of the normal lateral acceleration parameter, the travel route deviation prediction unit 210 may calculate the normal lateral acceleration parameter using normal steering information and a vehicle travel speed recognized based on the map data.

In this case, it is preferable that the normal lateral acceleration parameter be determined as the maximum value of each of the travel speed and the normal steering information, as described above. However, software included in a fully autonomous vehicle is generally set to prevent the vehicle from traveling beyond the speed limit set for a corresponding travel road. Accordingly, in the case of a fully autonomous vehicle, the travel route deviation prediction unit 210 may determine the maximum normal lateral acceleration parameter by recognizing the travel speed of the vehicle as the speed limit of the travel road.

As an example, the following description is based on travel road A. The travel route deviation prediction unit 210 recognizes speed limit information A3 of the travel road (road A) among the speed information included in the map data as the travel speed and recognizes steering information corresponding to the states of the travel road (road A) among the steering information included in the map data, for example, allowable torque information A5 or allowable steering angle information A6 as the normal steering information. Also, the travel route deviation prediction unit 210 calculates the normal lateral acceleration parameter by substituting the speed limit information A3 of travel road A and the allowable torque information A5 or the allowable steering angle information A6 into the above-described Equation 1.

Meanwhile, in the case of the abnormal lateral acceleration parameter, the travel route deviation prediction unit 210 may estimate the abnormal lateral acceleration parameter using abnormal steering information and a vehicle travel speed recognized based on the map data.

Even in this case, it is preferable that the abnormal lateral acceleration parameter be determined as the maximum value of each of the travel speed and the abnormal steering information, as described above. Accordingly, in the case of a fully autonomous vehicle, the travel route deviation prediction unit 210 may determine the maximum abnormal lateral acceleration parameter by recognizing the travel speed of the vehicle as the speed limit of the travel road.

As an example, the following description is based on travel road A. The travel route deviation prediction unit 210 recognizes the speed limit information A3 of the travel road (road A) among the speed information included in the map data as the travel speed.

Also, the travel route deviation prediction unit 210 recognizes, as the abnormal steering information, steering information corresponding to a second target output signal to which a first target output signal of the steering control device 150 is expected to decrease when the vehicle is abnormal among the steering information included in the map data, for example, abnormal maximum torque information V3 or abnormal maximum steering angle information V4.

Subsequently, the travel route deviation prediction unit 210 estimates the abnormal lateral acceleration parameter by substituting the speed limit information A3 of travel road A and the abnormal maximum torque information V3 or the abnormal maximum steering angle information V4 into the above-described Equation 1.

There is a need to predict whether the vehicle has deviated from the normal travel route by using the normal lateral acceleration parameter and abnormal lateral acceleration parameter calculated in this way. This is to apply an alternative lateral acceleration parameter to a region where the probability that danger will occur upon a breakdown is relatively high when the vehicle travels autonomously along the normal travel route on a partial section of a curved travel road.

In order to clearly understand the present invention, a normal travel route, a deviated travel route, etc. which are generated according to the map data will be visually shown through modeling and described in detail below.

Figure 8:
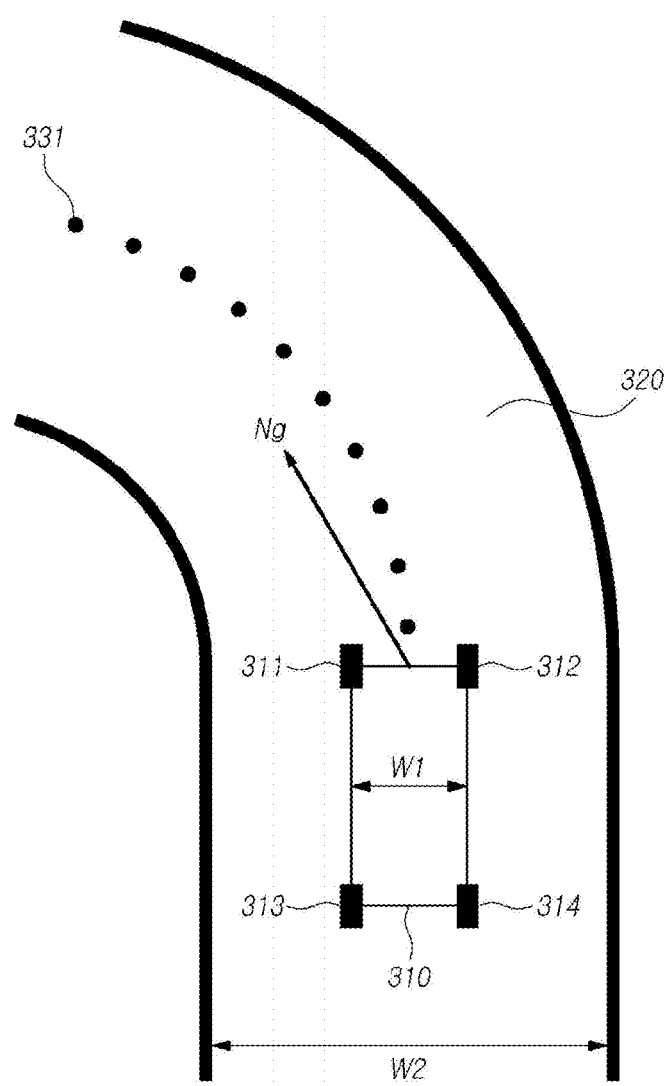
FIG. 8 is a diagram illustrating an example of generating a normal travel route according to another embodiment of the present invention.
Figure 9:
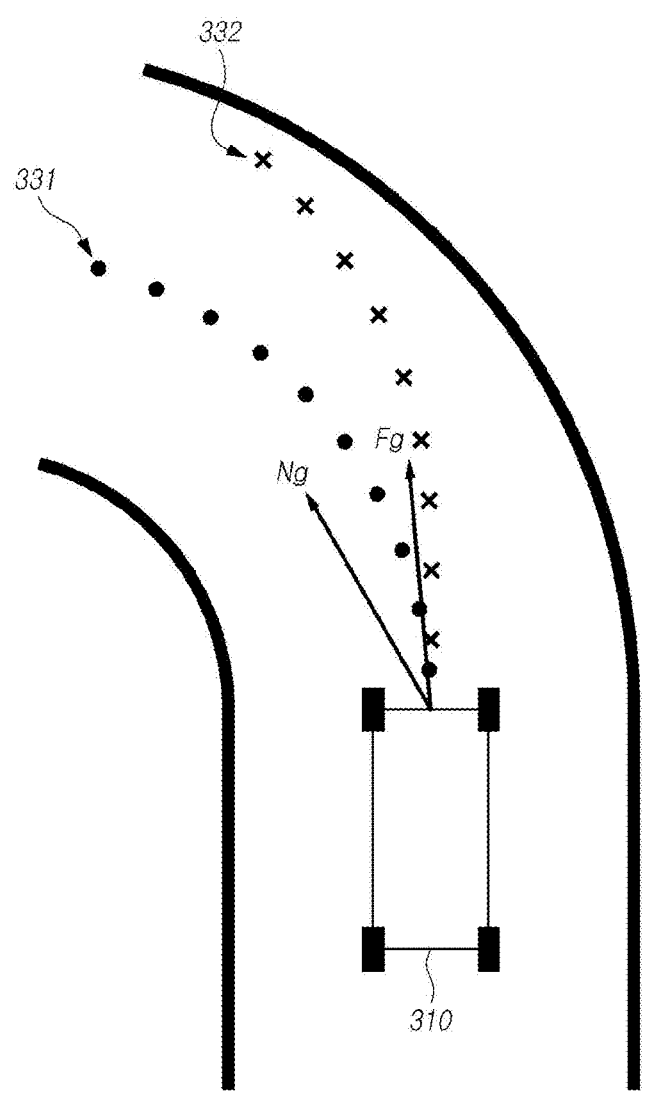
FIG. 9 is a diagram illustrating an example of determining whether a vehicle deviates from the normal travel route according to another embodiment of the present invention.

FIG. 8 is a diagram illustrating an example of generating a normal travel route 331 according to another embodiment of the present invention, and FIG. 9 is a diagram illustrating an example of determining whether a vehicle deviates from the normal travel route 331 according to another embodiment of the present invention.

Referring to FIG. 8, the travel route deviation prediction unit 210 may generate a normal travel route on a travel road using the lateral width of a vehicle, the road width of the travel road, and the normal lateral acceleration parameter of the travel road which are included in the map data.

As an example, the following description is based on travel road A. The travel route deviation prediction unit 210 extracts the lateral width information of the vehicle included in specification information V1 from travel map data included in the map data, extracts road width information A4 of the travel road (road A) from road map data included in the map data, and estimates the location of the vehicle on the travel road on the basis of the extracted lateral width information and the road width information A4.

In the case of a fully autonomous vehicle, the vehicle may be generally located at the center of the travel road. Accordingly, the location of the vehicle on the travel road may be schematically estimated by the road width and the lateral width of the vehicle.

Also, when the location of the vehicle is estimated, the locations of wheels disposed in the vehicle may also be estimated. The locations of the wheels may be visually ascertained using wheel models 311 to 314 as shown in FIG. 8.

Here, information regarding the lateral width of the vehicle and information regarding the road width of the travel road may be visually ascertained using a vehicle width W1 of a vehicle model 310 and a road width W2 of a travel road model 320 as shown in FIG. 8.

When the location of the vehicle is estimated, the travel route deviation prediction unit 210 may generate a normal travel route by generating a route virtually extending in the direction of a computed normal lateral acceleration parameter Ng as described above with reference to FIG. 7.

Here, the normal travel route 331 may be visually ascertained using a dotted line present on the travel road model 320, as shown in FIG. 8.

Referring to FIG. 9, when an abnormal lateral acceleration parameter Fg estimated based on the speed limit of the travel road included in the map data is smaller than the normal lateral acceleration parameter Ng calculated based on the speed limit, the travel route deviation prediction unit 210 may predict that the vehicle deviates from the normal travel route on the curved travel road.

As an example, the following description is based on FIGS. 5 and 7 and travel road A. The travel route deviation prediction unit 210 estimates the abnormal lateral acceleration parameter Fg by substituting the speed limit information A3 of travel road A and the abnormal maximum torque information V3 or the abnormal maximum steering angle information V4 into Equation 1. Also, the travel route deviation prediction unit 210 computes the normal lateral acceleration parameter Ng by substituting the speed limit information A3 and the allowable torque information A5 or the allowable steering angle information A6 into Equation 1.

Subsequently, when the estimated abnormal lateral acceleration parameter Fg is smaller than the normal lateral acceleration parameter Ng, the travel route deviation prediction unit 210 predicts that the vehicle deviates from the normal travel route 331 on the curved travel road (road A).

As another example, when the difference between the normal lateral acceleration parameter Ng and the abnormal lateral acceleration parameter Fg is greater than or equal to a predetermined reference value, the travel route deviation prediction unit 210 may predict that the vehicle deviates from the normal travel route on the curved travel road.

Here, the travel route deviation prediction unit 210 may expect a deviated travel route 332 using the estimated abnormal lateral acceleration parameter Fg. In detail, the travel route deviation prediction unit 210 may expect the deviated travel route 332 by generating a route virtually extending in the direction of the abnormal lateral acceleration parameter Fg.

Meanwhile, although it is expected that the vehicle will deviate from the normal travel route, the vehicle may not deviate from the travel route. In this case, even if a broken vehicle is steered using the abnormal steering information, the vehicle may safely travel without a safety accident.

Accordingly, there is a need to calculate an alternative lateral acceleration parameter under the condition that the vehicle is expected to deviate from a specific travel road among a plurality of abnormal lateral acceleration parameters predicted for a plurality of travel roads.

A method of determining whether a vehicle deviates from a travel road will be described in detail below.

Figure 10:
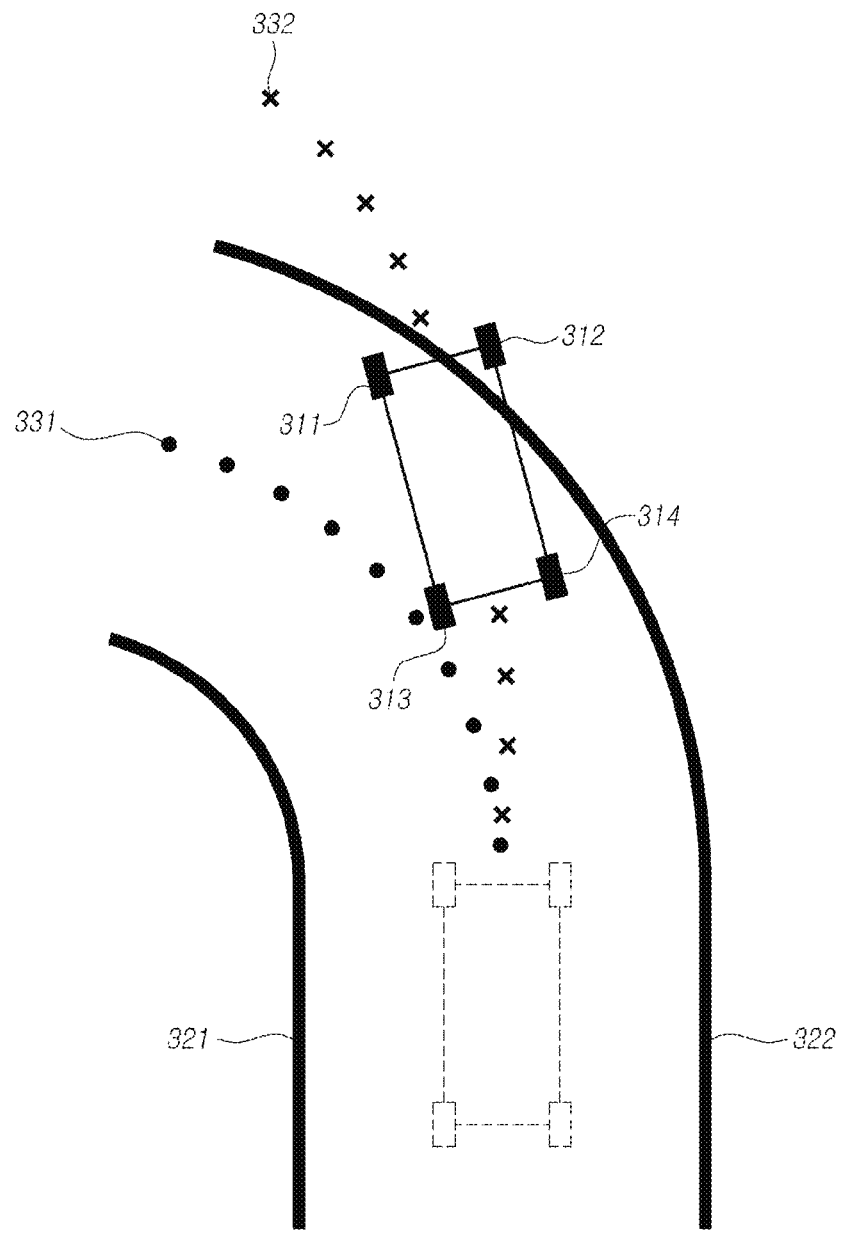
FIG. 10 is a diagram illustrating an example of determining whether a vehicle deviates from a travel road according to another embodiment of the present invention.

FIG. 10 is a diagram illustrating an example of determining whether a vehicle deviates from the travel road according to another embodiment of the present invention.

Referring to FIG. 10, the parameter calculation unit 220 may estimate the locations of wheels of a vehicle present on the deviated travel route 332 expected on the basis of the abnormal lateral acceleration parameter Fg by using the locations of the wheels present on the normal travel route 331 generated on the basis of the map data and may determine that the vehicle deviates from the travel road when the estimated locations of the wheels deviate from the travel road.

As a detailed example, the following description uses the vehicle model 310, the wheel models 311 to 314, and the like. When the normal travel route 331 is generated by the travel route deviation prediction unit 210 as described above, the locations of the wheels corresponding to the vehicle model 310 and the wheel models 311 to 314 present on the normal travel route 331 are also estimated. Subsequently, when the deviated travel route 332 is generated by the travel route deviation prediction unit 210, the parameter calculation unit 220 moves the vehicle model 310 located on the normal travel route 331 along the deviated travel route 332. When the front right wheel model 312, which is any one of the wheel models 311 to 314, deviates from a second road boundary 322, the parameter calculation unit 220 determines that the vehicle deviates from the travel road.

FIG. 10 shows that the vehicle is turning left. However, when the front left wheel model 311, which is one of the wheel models 311 to 314, deviates from a first road boundary 321 on a road where the vehicle is turning right unlike FIG. 10, the parameter calculation unit 220 may determine that the vehicle deviates from the travel road.

When it is determined that the vehicle deviates from the travel road, the parameter calculation unit 220 may calculate an alternative lateral acceleration parameter using the map data illustratively shown in FIG. 7. As described above, the alternative lateral acceleration parameter may be determined as the maximum value of each of the travel speed and the abnormal steering information.

A specific embodiment in which an alternative lateral acceleration parameter is calculated will be described below with reference to a diagram illustratively showing map data.

Figure 11:
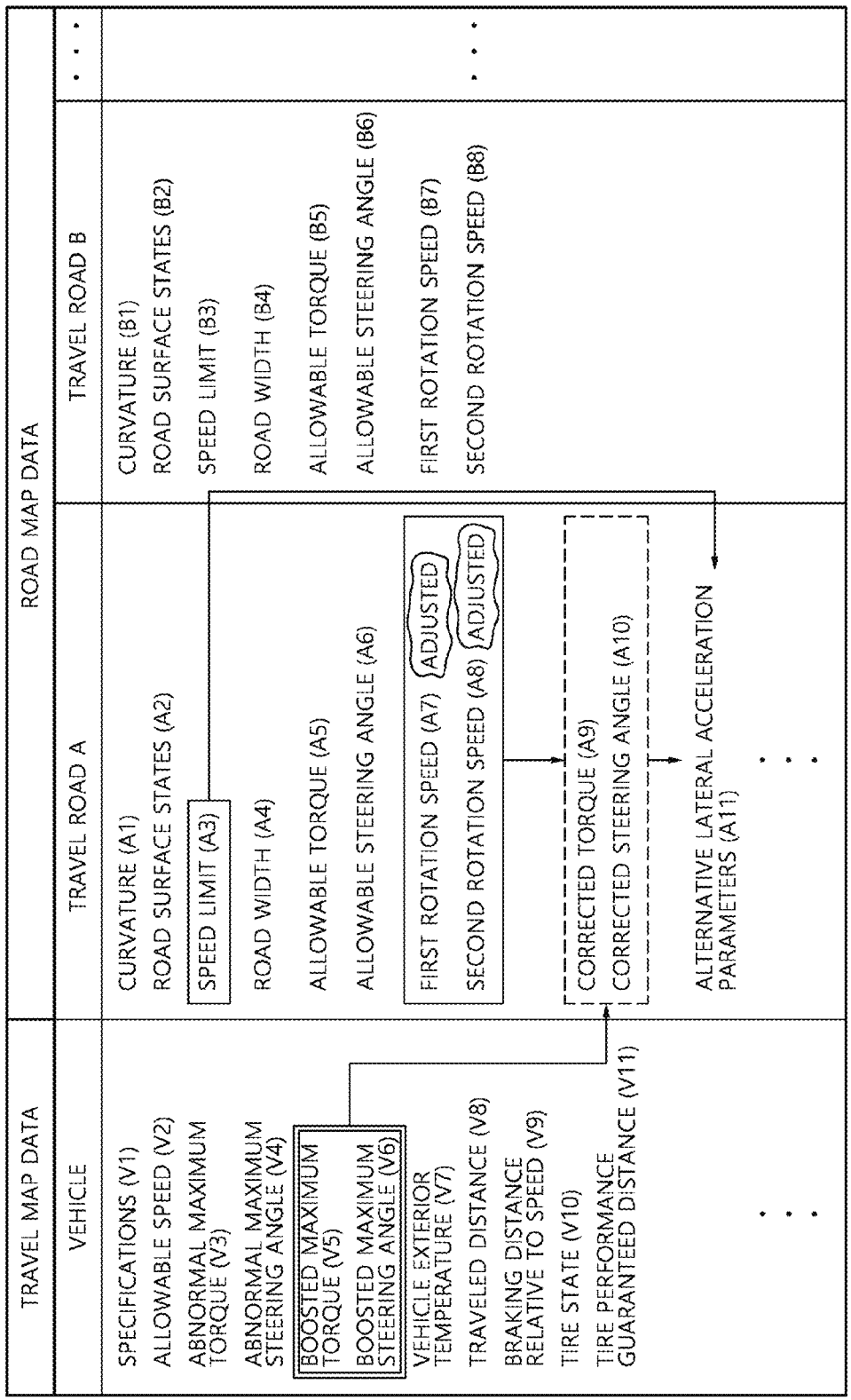
FIG. 11 is a diagram illustrating an example of calculating an alternative lateral acceleration parameter on the basis of map data according to another embodiment of the present invention.

FIG. 11 is a diagram illustrating an example of calculating an alternative lateral acceleration parameter on the basis of map data according to another embodiment of the present invention.

Referring to FIG. 11, when the vehicle is predicted to deviate from the travel road, the parameter calculation unit 220 may adjust the speed ratio between the rotational speeds of the left and right wheels of the vehicle.

In the case of a curved travel road, by changing the speed ratio between the rotational speeds of the left wheels and the right wheels although the size of an output signal needed to steer the vehicle is insufficient, it is possible to correct the steering angle of the broken vehicle.

As an example, the following description is based on travel road A. When road A is a left-turn road, the parameter calculation unit 220 decreases the first rotational speed (the rotational speed of the left wheels) over an originally set value and increases the second rotational speed (the rotational speed of the right wheels) over an originally set value. In this case, the speed ratio between the first rotational speed and the second rotational speed increases.

Meanwhile, when road A is a right-turn road, the first rotational speed and the second rotational speed are adjusted opposite to the above-described operation.

When the speed ratio is adjusted, the parameter calculation unit 220 may generate corrected steering information on the basis of the adjusted speed ratio.

As an example, the following description is based on travel road A. The parameter calculation unit 220 generates corrected torque information A9 and corrected steering angle information A10, each of which is corrected steering information corresponding to the increased speed ratio.

When the corrected steering information is generated, the parameter calculation unit 220 may calculate an alternative lateral acceleration parameter using the corrected steering information and a vehicle travel speed recognized based on the map data.

As an example, the following description is based on travel road A. The parameter calculation unit 220 generates an alternative lateral acceleration parameter by substituting the speed limit information A3 of travel road A and the corrected torque information A9 or the corrected steering angle information A10 into the above-described Equation 1.

Meanwhile, when the steering control device 150 performs fail-safe operation based on the redundant system to boost up a reduced target output signal, the parameter calculation unit 220 may calculate an alternative lateral acceleration parameter using steering information corresponding to the boosted target output signal.

That is, when a vehicle is predicted to deviate from a travel road, the parameter calculation unit 220 may generate corrected steering information on the basis of steering information corresponding to a second target output signal that is expected when the steering control device 150 boosts up a reduced first target output signal and may calculate the alternative lateral acceleration parameter using corrected steering information and a vehicle travel speed recognized based on the map data.

For example, the following description is based on travel road A. The parameter calculation unit 220 generates the corrected steering information (the corrected torque information A9 or the corrected steering angle information A10) according to boosted maximum torque information V5 and boosted maximum steering angle information V6, each of which is steering information corresponding to the target output signal boosted up by the steering control device 150. Also, the parameter calculation unit 220 calculates the alternative lateral acceleration parameter by substituting the speed limit information A3 of travel road A and the corrected steering information (the corrected torque information A9 or the corrected steering angle information A10) into the above-described Equation 1.

Meanwhile, when the alternative lateral acceleration parameter is calculated, the map data update unit 230 may apply the alternative lateral acceleration parameter to road map data included in the map data. However, the present invention is not limited thereto.

For example, the following description is based on travel road A. The map data update unit 230 may apply calculated alternative lateral acceleration parameter information A11 to the road map data and then store the road map data.

As described above, the map data setting device 200 according to another embodiment of the present invention can prevent a breakdown when the vehicle may deviate from a specific travel road.

Even when the vehicle travels autonomously by using the alternative lateral acceleration parameter, the vehicle could be still predicted to deviate from the travel road. In this case, there is a need to correct the alternative lateral acceleration parameter.

Figure 12:
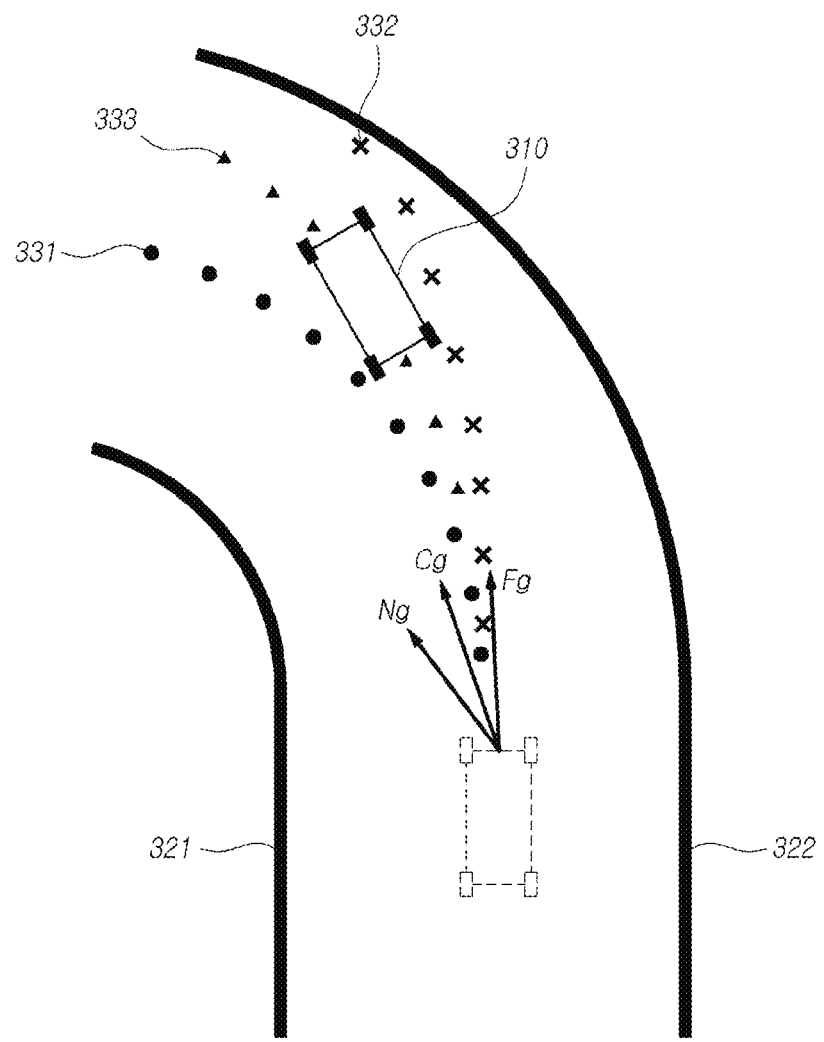
FIG. 12 is a diagram illustrating an example of correcting the alternative lateral acceleration parameter according to another embodiment of the present invention.

FIG. 12 is a diagram illustrating an example of correcting the alternative lateral acceleration parameter according to another embodiment of the present invention.

Referring to FIG. 12, the parameter calculation unit 220 may evaluate whether to prevent a vehicle from deviating from a travel road on the basis of a computed first alternative lateral acceleration parameter and preferably the maximum alternative lateral acceleration parameter Cg.

As a detailed example, the parameter calculation unit 220 may move the vehicle model 310 located on the normal travel route 331 along an alternative travel route 333 as described above with reference to FIG. 10 and may evaluate whether any front wheel model of the wheel models 311 to 314 deviates from the road boundary 321 or 322.

Here, the alternative travel route 333 refers to a route virtually extending in the direction of the alternative lateral acceleration parameter Cg, similarly to the method of generating the normal travel route 331 or the deviated travel route 332 which is described above with reference to FIG. 10.

When it is possible to prevent the vehicle from deviating from the travel road, the parameter calculation unit 220 may output information regarding the first alternative lateral acceleration parameter Cg to the map data update unit 230.

In this case, the map data update unit 230 may perform an update by applying the received first alternative lateral acceleration parameter Cg to the map data.

When it is not possible to prevent the vehicle from deviating from the travel road, the parameter calculation unit 220 may determine an allowable braking distance on the basis of vehicle speed information included in the map data and may calculate a second alternative lateral acceleration parameter Cg' smaller than the first alternative lateral acceleration parameter Cg on the basis of a vehicle travel speed derived from the allowable braking distance.

Here, the allowable braking distance may refer to a braking distance that may be allowed in the range of speed information included in map data, speed-based braking distance information, and the like.

A method of determining the allowable braking distance will be described in detail using the map data shown in FIG. 13.

FIG. 13 is a diagram illustrating an example of determining the allowable braking distance on the basis of the map data according to another embodiment of the present invention.

Referring to FIG. 13, the parameter calculation unit 220 may extract the maximum speed information from speed information to be used to compute the second alternative lateral acceleration parameter included in the range greater than the abnormal lateral acceleration parameter and smaller than the first alternative lateral acceleration parameter and may determine a braking distance corresponding to the extracted speed information as the allowable braking distance.

In detail, the first alternative lateral acceleration parameter and preferably the maximum alternative lateral acceleration parameter Cg may be computed using the corrected steering information and the speed limit of the travel road, and the second alternative lateral acceleration parameter Cg' may be computed using the corrected steering information and the vehicle travel speed selected within the range of allowable speed information V2.

In this case, the parameter calculation unit 220 extracts the maximum speed information from the allowable speed information V2 used for the second alternative lateral acceleration parameter Cg' included in the range greater than the abnormal lateral acceleration parameter Fg and smaller than the first alternative lateral acceleration parameter Cg (Fg<Cg'<Cg).

Also, the parameter calculation unit 220 determines braking distance information V9 corresponding to speed information extracted from braking distance information V9 corresponding to a plurality of speeds as the allowable braking distance.

As described above, when the vehicle is predicted to be unable to safely travel autonomously on the basis of the alternative lateral acceleration parameter set as the best solution in preparation for a breakdown, the map data setting device 200 applied to the steering control system according to another embodiment of the present invention can allow the vehicle to safely travel by calculating still another alternative lateral acceleration parameter as a second-best solution.

Meanwhile, actual vehicle travel conditions vary greatly. Thus, when the map data setting device 200 calculates an alternative lateral acceleration parameter under a certain reference condition, it may be difficult to actually apply the calculated alternative lateral acceleration parameter to an autonomous vehicle which travels actually.

An embodiment of calculating an alternative lateral acceleration parameter applicable to a travel condition other than the reference condition will be described in detail.

Figure 14:
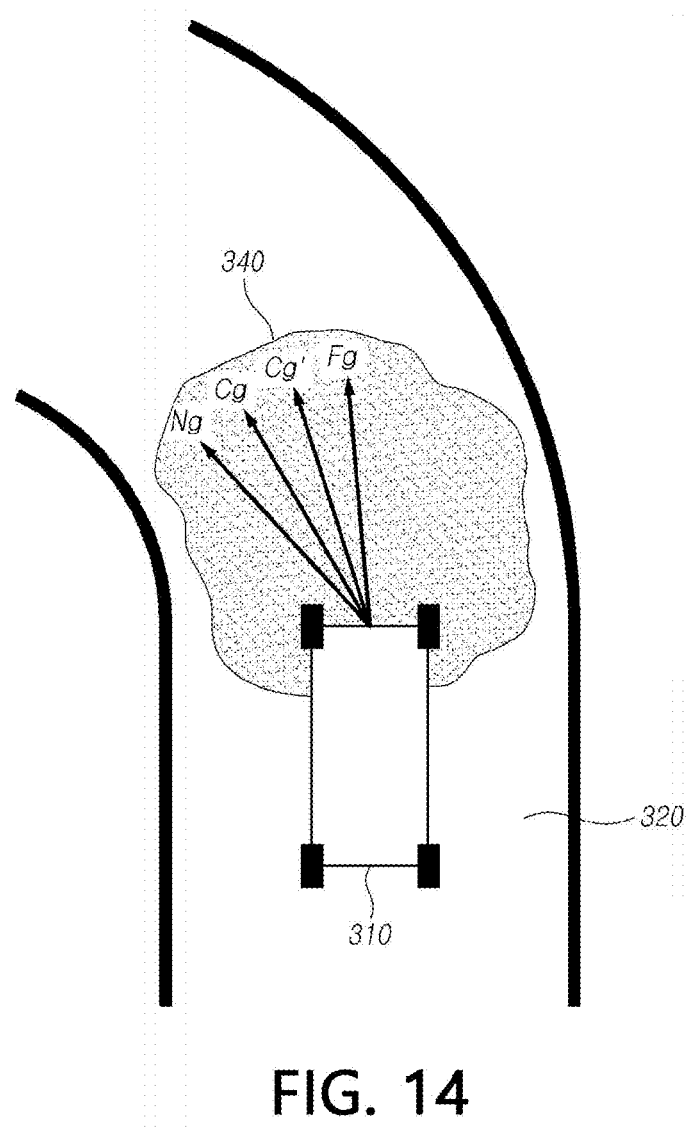
FIG. 14 is a diagram illustrating another example of correcting the alternative lateral acceleration parameter according to another embodiment of the present invention.

FIG. 14 is a diagram illustrating another example of correcting an alternative lateral acceleration parameter according to another embodiment of the present invention.

When the vehicle travel condition is a predetermined reference condition by default, the parameter calculation unit 220 may calculate an alternative lateral acceleration parameter in the same way as described above.

Here, the travel condition may include the external temperature of the vehicle traveling on a specific travel road, the states (e.g., abrasion, friction, traction, etc.) of the tires disposed in the vehicle, the state of the specific travel road (e.g., a frozen road, a wet road, etc.), specification information (e.g., empty vehicle weight, maximum number of passengers, etc.), and the like.

The reference condition may refer to an ideal travel condition related to vehicle travel. That is, the reference condition may include the state of a travel road being made of asphalt material, the state of a road surface having no snow or no water hole, an average temperature corresponding to a sunny day, and the like.

However, referring to FIG. 14, it is assumed that the travel condition is that a vehicle model 310 travels through a water hole model 340 present in a travel road model 320. Since the travel condition does not satisfy the predetermined reference condition, it may be difficult to actually apply an alternative lateral acceleration parameter calculated under the reference condition to an autonomous vehicle which travels actually.

Accordingly, the parameter calculation unit 220 may determine whether the vehicle travel condition satisfies the predetermined reference condition on the basis of the map data.

When the vehicle travel condition satisfies the predetermined reference condition, the parameter calculation unit 220 may calculate a first alternative lateral acceleration parameter, which is an alternative lateral acceleration parameter computed under the reference condition.

When the travel condition does not satisfy the predetermined reference condition, the parameter calculation unit 220 may calculate a second alternative lateral acceleration parameter by applying an adjustment coefficient corresponding to the travel condition to the first alternative lateral acceleration parameter calculated under the reference condition.

That is, the second alternative lateral acceleration parameter Cg' may be determined using the following Equation 2.

$$Cg' = Cg \times \alpha \quad \text{[Equation 2]}$$

where Cg is a first alternative lateral acceleration parameter calculated under a reference condition, and $\alpha$ is an adjustment coefficient.

Here, the adjustment coefficient $\alpha$ may refer to a coefficient calculated using an evaluated tire state coefficient of a vehicle and an evaluated surface friction coefficient of a travel road due to the influence of external temperature.

That is, the adjustment coefficient $\alpha$ may be determined using the following Equation 3.

$$\alpha = 1 - \beta + \gamma \quad \text{[Equation 3]}$$

where $\beta$ is an evaluated travel road surface friction coefficient due to the influence of external temperature, and $\gamma$ is an evaluated tire state coefficient of a vehicle.

Here, the evaluated travel road surface friction coefficient $\beta$ may be relatively determined through simulation. For example, the evaluated friction coefficient $\beta$ of a dry asphalt road may be equal to 1, and the evaluated friction coefficient $\beta$ of a wet road surface or a frozen road surface may be smaller than 1.

The evaluated state coefficient $\gamma$ of a tire may refer to a value obtained by setting an initial state of a tire at the time of manufacture, for example, the initial traction of a tire to 1 and applying the degree to which the state of the tire is changed according to the travel distance of the vehicle to the initial state. That is, the evaluated state coefficient $\gamma$ of the tire may be determined using the following Equation 4.

$$\gamma = 1 - \frac{d}{d_0} \quad \text{[Equation 4]}$$

where d is the travel distance of a vehicle, for example, travel distance information V8 included in the map data, and d0 is an initial tire performance-guaranteed distance, for example, tire performance-guaranteed distance information V11 included in the map data.

As described above, the map data setting device 200 can calculate an alternative lateral acceleration parameter corresponding to a travel condition such that the vehicle may safely travel autonomously under several travel conditions.

The steering control device 150 applied to the steering control system according to another embodiment of the present invention will be described in detail below.

Figure 15:
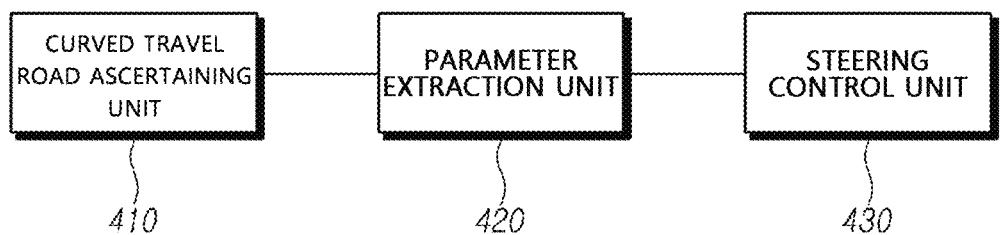
FIG. 15 is a diagram showing a steering control device applied to the steering control system according to another embodiment of the present invention.

FIG. 15 is a diagram showing a steering control device 400 applied to the steering control system according to another embodiment of the present invention.

Referring to FIG. 15, the steering control device 400 applied to the steering control system according to another embodiment of the present invention may include a curved travel road ascertaining unit 410, a parameter extraction unit 420, a steering control unit 430, etc.

The curved travel road ascertaining unit 410 may check a curved travel road using at least one of sensing data and map data.

Here, the sensing data may be at least one of first sensing data output by the vehicle exterior sensor 110 shown in FIG. 5 and second sensing data output by the vehicle detection sensor 120 shown in FIG. 5.

Here, the map data may be data output by the map data setting devices 140 and 200 shown in FIGS. 5 and 6.

When the curved travel road is ascertained, the parameter extraction unit 420 may extract an alternative lateral acceleration parameter Cg replacing a normal lateral acceleration parameter Ng from the map data.

For example, the following description is based on travel road A included in the map data. The parameter extraction unit 420 extracts an alternative lateral acceleration parameter Cg for travel road A from the road map data shown in FIGS. 11 and 13.

According to the one example described above, the alternative lateral acceleration parameter Cg may be calculated using corrected steering information and a vehicle travel speed recognized on the basis of the map data. The corrected steering information may be generated on the basis of the speed ratio between the rotational speeds of the left and right wheels of the vehicle. In this case, the speed ratio may be adjusted to increase as described above.

According to the other example described above, the alternative lateral acceleration parameter Cg may be calculated using corrected steering information and a vehicle travel speed recognized based on the map data, and the corrected steering information may be generated based on steering information corresponding to a second target output signal that is expected when the steering control unit 430 included in the steering control device 400 boosts up a reduced first target output signal.

The steering control unit 430 may generate a target output signal to control the steering of the vehicle on the curved travel road on the basis of the sensing data and the alternative lateral acceleration parameter and then may output the target output signal to the actuator 160.

For example, the steering control unit 430 ascertains a portion of the curved travel road from the sensing data, extracts the corrected steering information (steering torque or steering angle) and the speed limit of the travel road, which are factors included in the alternative lateral acceleration parameter, and generates and outputs a target output signal such that the vehicle is steered to travel autonomously on a portion of the curved travel road according to the extracted corrected steering information and speed limit.

Here, the steering control unit 430 may additionally receive a communication signal, for example, a GPS signal from the communication module 130 and may output a target output signal to the actuator 160 such that the steering of the vehicle is controlled.

When the vehicle is abnormal due to a vehicle's breakdown or the like, the steering control device 400 applied to the steering control system according to another embodiment of the present invention may maintain a reduced target output signal or restore a reduced target output signal to its original value which is a normal target output signal. In this case, when a current situation is emergent, the steering control device 400 may perform fail-safe operation based on a redundant system capable of boosting up the reduced target output signal.

An embodiment of the redundant system and the fail-safe operation based on the redundant system will be described in detail below.

Figure 16:
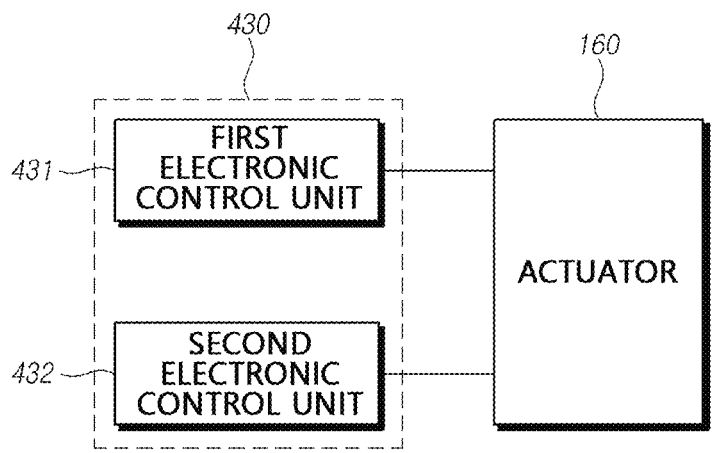
FIG. 16 is a diagram illustrating a signal flow between an actuator and a steering control unit according to another embodiment of the present invention.

FIG. 16 is a diagram illustrating a signal flow between the steering control unit 430 and the actuator 160 according to another embodiment of the present invention.

Referring to 16, the steering control unit 430 included in the steering control device 400 applied to the steering control system according to another embodiment of the present invention may include two or more electronic control units (ECUs) capable of outputting target output signals to the actuator 160.

In this specification, for convenience of description, this embodiment will be described using two ECUs, but the present invention is not limited thereto. The description may be applied to three ECUs in the same way.

With continuing reference to FIG. 16, the two ECUs included in the steering control unit 430 include a primary ECU and a sub-ECU. When the vehicle is abnormal, the primary ECU may transfer control authority to the sub-CPU while the primary ECU controls the actuator 160.

For example, when the primary ECU is a first ECU 431 and the sub-ECU is a second ECU 432, the first ECU generates a target output signal necessary to steer the vehicle and outputs the generated target output signal to the actuator 160. When the vehicle is abnormal, the first ECU 431 transfers control authority to the second ECU 432.

Meanwhile, all of the two or more ECUs operate as primary ECUs, and each of the primary ECUs may output a portion obtained by uniformly dividing a target output signal to be output to the actuator 160. In this case, when there is an abnormal ECU, only the other normal primary ECU may output the target output signal to the actuator 160.

For example, when both of the first ECU 431 and the second ECU 432 operate as primary ECUs, each of the first ECU 431 and the second ECU 432 outputs up to 50% of the target output signal to the actuator 160. The actuator 160 receives 50% of the target output signal from each of the first ECU 431 and the second ECU 432 and operates to output a steering torque on the basis of the total target output signal.

In this case, when the first ECU 431 breaks down, only the second ECU 432 outputs the reduced first target output signal, that is, up to 50% of the target output signal to the actuator 160.

In this case, when the second ECU 432 determines that a current situation is emergent, the second ECU 432 may boost up the first target output signal and may generate the second target output signal greater than or equal to 50% of the maximum target output signal which is temporarily determined within an allowable range and then output the second target output signal to the actuator 160.

An embodiment in which a vehicle autonomously travels on a straight travel road or a curved travel road on the basis of map data according to another embodiment of the present invention will be described below.

Figure 17:
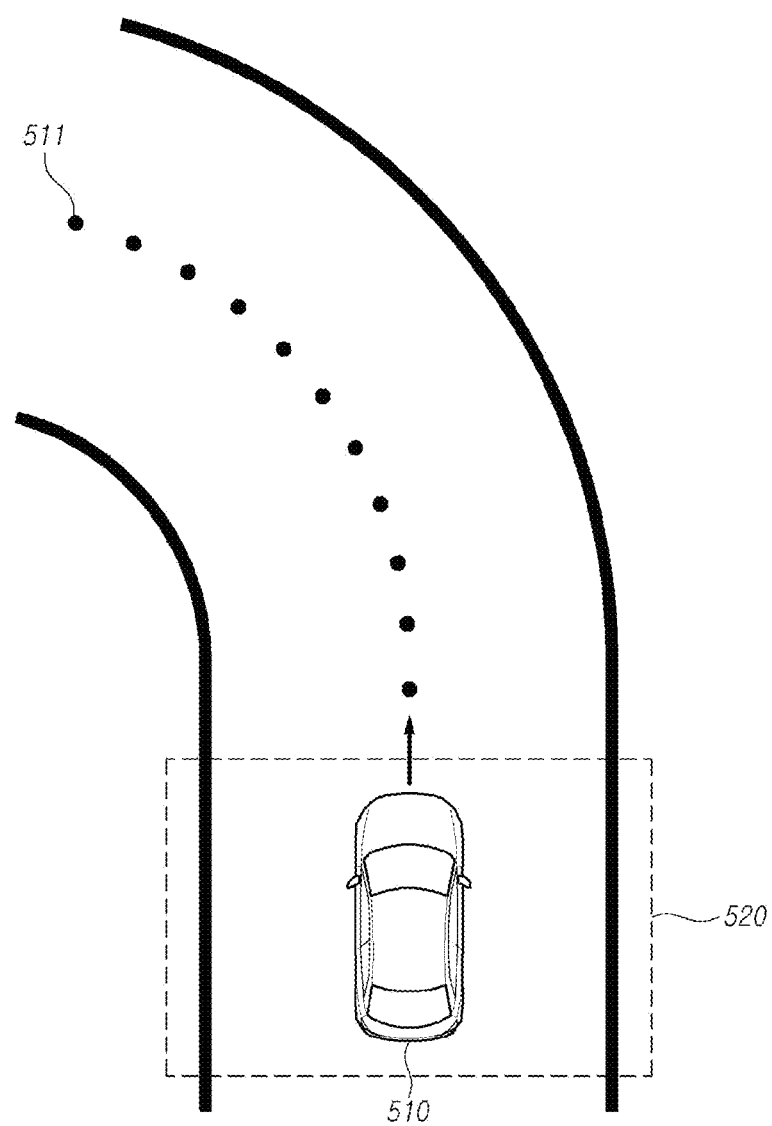
FIG. 17 is a diagram illustrating an example in which a vehicle travels on a straight travel road section on the basis of map data according to another embodiment of the present invention.

FIG. 17 is a diagram showing an example in which a vehicle 510 travels on a straight travel road section 520 on the basis of map data according to another embodiment of the present invention.

Referring to FIG. 17, the vehicle 510 including the steering control system 100 according to another embodiment of the present invention may travel autonomously (or fully autonomously).

In detail, the vehicle 510 may compare a sensing result included in the sensing data to data regarding a travel road stored in the map data. When the two pieces of data are consistent with each other, the vehicle 510 may travel autonomously along a normal travel route 511 generated in a section of a specific travel road on the basis of travel information about the corresponding travel road included in the map data.

For example, when the vehicle 510 travels autonomously along the straight travel road section 520, the vehicle 510 travels autonomously along the straight travel road section 520 using travel information corresponding to data consistent with the sensing result of the straight travel road section 520 included in the sensing data among a plurality of pieces of data about the straight travel road included in the map data.

Figure 18:
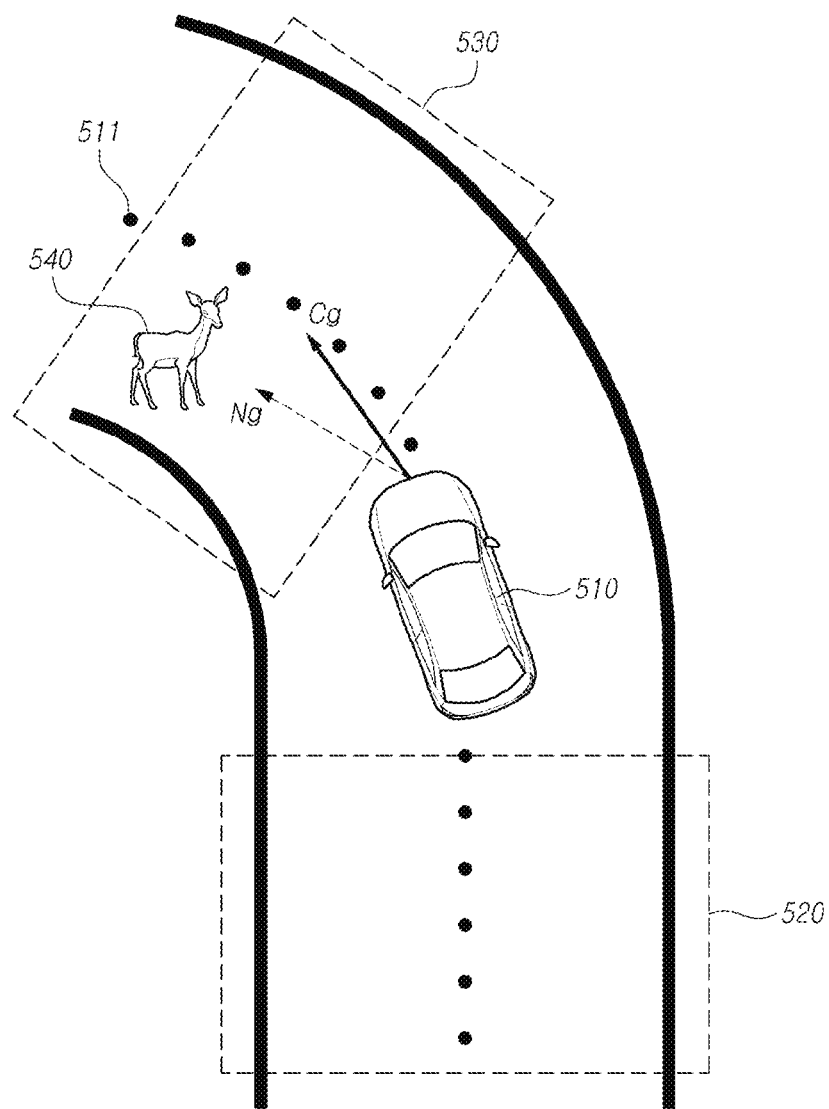
FIG. 18 is a diagram illustrating an example in which a vehicle travels on a curved travel road section on the basis of map data according to another embodiment of the present invention.

FIG. 18 is a diagram showing an example in which the vehicle 510 travels on a curved travel road section 530 on the basis of map data according to another embodiment of the present invention.

Referring to FIG. 18, when the vehicle 510 including the steering control system 100 according to another embodiment of the present invention enters the curved travel road section 530 through the straight travel road section 520, the vehicle 510 may travel autonomously on the basis of the alternative lateral acceleration parameter Cg stored in the map data even if a breakdown does not occur.

For example, when the vehicle 510 enters the curved travel road section 530, the vehicle 510 travels autonomously according to corrected steering information and a vehicle travel speed included in the alternative lateral acceleration parameter Cg instead of traveling autonomously according to normal steering information and a vehicle travel speed included in a normal lateral acceleration parameter Ng.

In this case, since the vehicle 510 travels autonomously on the basis of the alternative lateral acceleration parameter Cg, the vehicle 510 travels autonomously along an alternative travel route 512 instead of a normal travel route 511 generated on the basis of the normal lateral acceleration parameter Ng.

Also, the vehicle 510 may travel autonomously on a specific curved travel road along the alternative travel route 512, but may travel autonomously in a partial section of the curved travel road along the alternative travel route 512 and in the remaining section of the curved travel road along the normal travel route 511 again.

Meanwhile, the vehicle 510 may sense an obstacle 540 such as a roe deer, a deer, and a rock while traveling autonomously. In this case, when the vehicle 510, in particular, the fully autonomous vehicle 510 keeps traveling on the basis of the alternative lateral acceleration parameter, it may be difficult to avoid collision with the obstacle 540.

Accordingly, the vehicle 510 may calculate steering information different from the previous steering information corresponding to the alternative lateral acceleration parameter in order to avoid the obstacle 540 and may perform avoidance control according to the calculated steering information.

For example, when obstacle information about the obstacle 540 present near the vehicle 510 is ascertained from the sensing data, the steering control unit 430 included in the steering control device 400 applied to the steering control system according to another embodiment of the present invention calculates second steering information greater than first steering information corresponding to the alternative lateral acceleration parameter Cg and generates a target output signal corresponding to the second steering information.

In this case, the second steering information is calculated in the range that is smaller than the steering information included in the normal lateral acceleration parameter Ng and greater than the steering information included in the alternative lateral acceleration parameter Cg.

Meanwhile, when the second steering information greater than the first steering information corresponding to the alternative lateral acceleration parameter Cg is calculated due to the influence of an obstacle present on a travel road, an alternative lateral acceleration parameter corresponding to the second steering information may be additionally calculated.

For example, the steering control unit 430 included in the steering control device 400 applied to the steering control system according to another embodiment of the present invention generates a command signal for instructing the map data setting devices 140 and 200 to additionally calculate an alternative lateral acceleration parameter by applying the obstacle information and the second steering information and then outputs the command signal to the map data setting devices 140 and 200.

The map data setting devices 140 and 200 applied to the steering control system according to another embodiment of the present invention may receive the command signal, additionally calculate the alternative lateral acceleration parameter, and update the map data by applying the calculated lateral acceleration parameter to the map data.

As described above, the steering control device 400 applied to the steering control system according to another embodiment of the present invention can perform avoidance control even on unpredictable obstacles.

Meanwhile, unlike a case where the vehicle 510 detects the obstacle 540, there is a case where the road surface state of the travel road is unexpectedly changed, for example, a case where a water hole or snow is present on the road surface.

An embodiment in which the vehicle 510 travels autonomously in an unexpected road surface state of a curved travel road will be described below.

Figure 19:
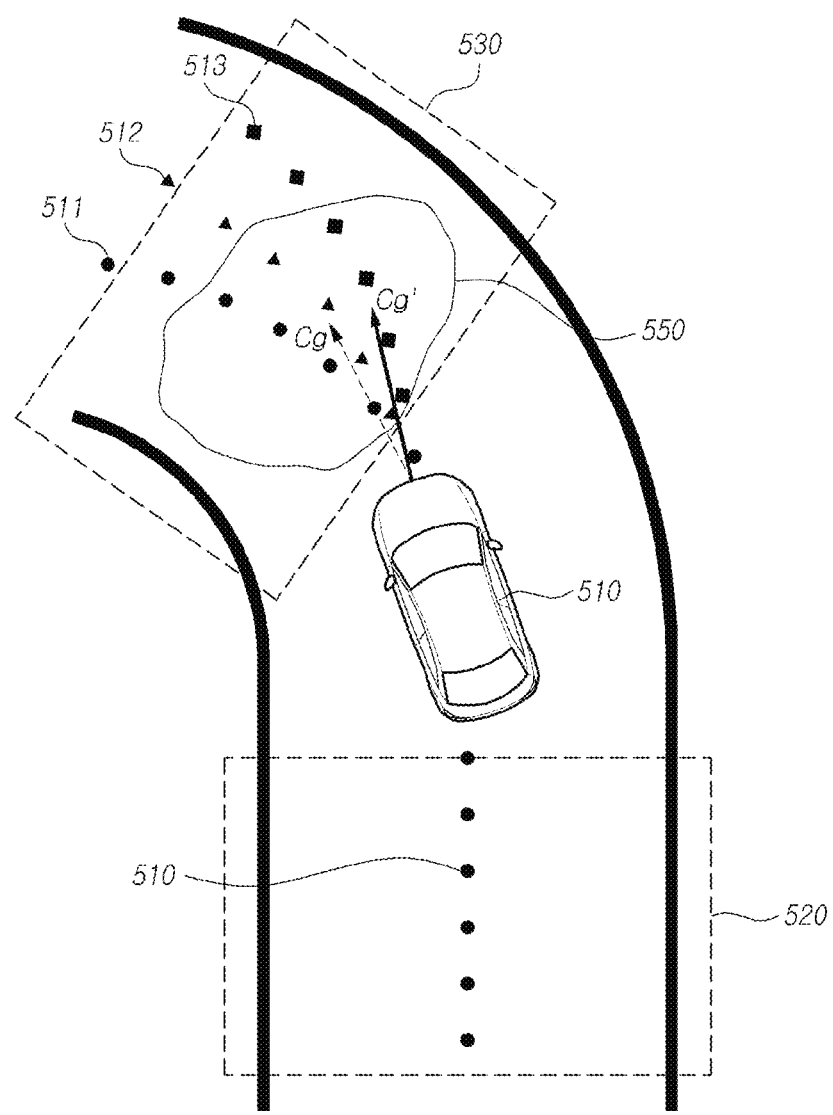
FIG. 19 is a diagram illustrating another example in which a vehicle travels on a curved travel road section on the basis of map data according to another embodiment of the present invention.

FIG. 19 is a diagram showing another example in which the vehicle 510 travels on a curved travel road section 530 on the basis of map data according to another embodiment of the present invention.

Referring to FIG. 19, even when the vehicle 510 does not have a breakdown in the curved travel road section 530 after passing through the straight travel road section 520, the vehicle 510 may travel autonomously on the basis of the alternative lateral acceleration parameter Cg under the reference conditions stored in the map data.

However, when a water hole 550 or the like is present in the curved travel road section 530, it may be difficult for the vehicle 510, in particular, the fully autonomous vehicle 510 to keep traveling on the basis of the alternative lateral acceleration parameter Cg under the reference condition.

Accordingly, the vehicle 510 may travel autonomously according to an alternative lateral acceleration parameter Cg' instead of the alternative lateral acceleration parameter Cg applied under the reference condition.

For example, the steering control unit 430 included in the steering control device 400 applied to the steering control system according to another embodiment of the present invention ascertains a vehicle travel condition including at least one of the external environment state of the vehicle 510 and the tire state of the vehicle 510 on the basis of the sensing data.

Also, the steering control unit 430 outputs a condition signal regarding the ascertained travel condition to the map data setting devices 140 and 200.

The map data setting devices 140 and 200 compare the travel condition to a predetermined reference condition and output map data storing the alternative lateral acceleration parameter Cg' corresponding to the comparison result.

As described above, the steering control device 400 applied to the steering control system according to another embodiment of the present invention can control the vehicle to safely travel autonomously in preparation for a breakdown even when the road surface state of the travel road is changed.

A map data setting method capable of performing the present invention will be described below.

Figure 20:
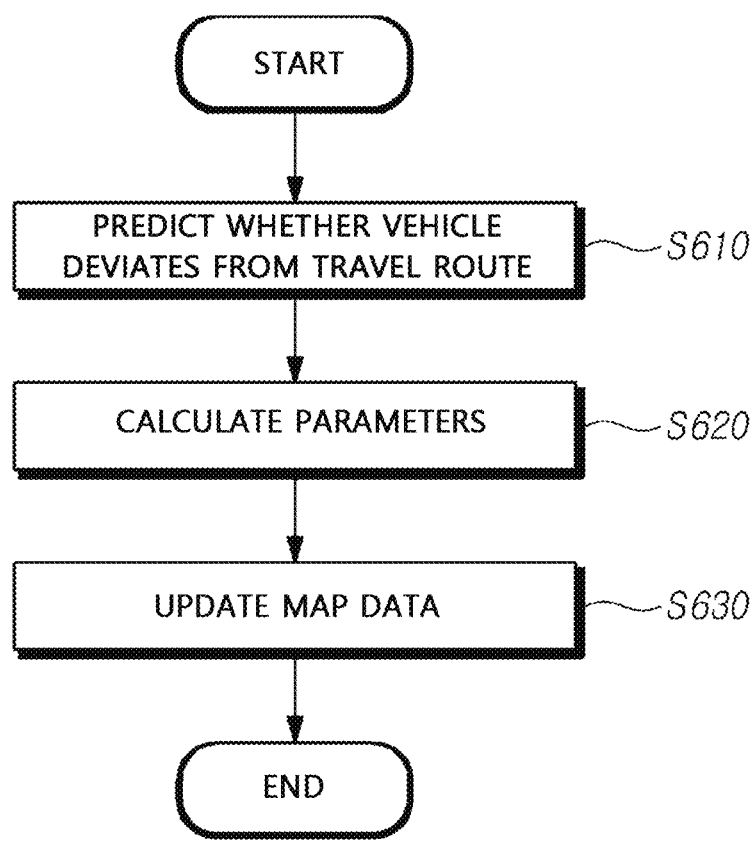
FIG. 20 is a flowchart illustrating a map data setting method applied to the control method of the steering control system according to another embodiment of the present invention.

FIG. 20 is a flowchart illustrating a map data setting method applied to the control method of the steering control system according to another embodiment of the present invention.

Referring to FIG. 20, the map data setting method applied to the control method of the steering control system according to another embodiment of the present invention may include a travel route deviation prediction operation S610, a parameter calculation operation S620, a map data update operation S630, and the like.

The travel route deviation prediction operation S610 may include predicting whether the vehicle 510 deviates from the normal travel route 331 on the travel road by comparing an abnormal lateral acceleration parameter Fg estimated when the state of the vehicle 510 is abnormal to a normal lateral acceleration parameter Ng applied when the state of the vehicle 510 is normal.

The parameter calculation operation S620 may include predicting whether the vehicle 510 deviates from the travel road when it is predicted that the vehicle 510 deviates from the normal travel route 331 and calculating an alternative lateral acceleration parameter Cg replacing the normal lateral acceleration parameter Ng of the travel road when it is predicted that the vehicle 510 deviates from the travel road.

The map data update operation S630 may include applying the alternative lateral acceleration parameter Cg to prestored map data to update the map data.

A steering control method capable of performing the present invention will be described below.

Figure 21:
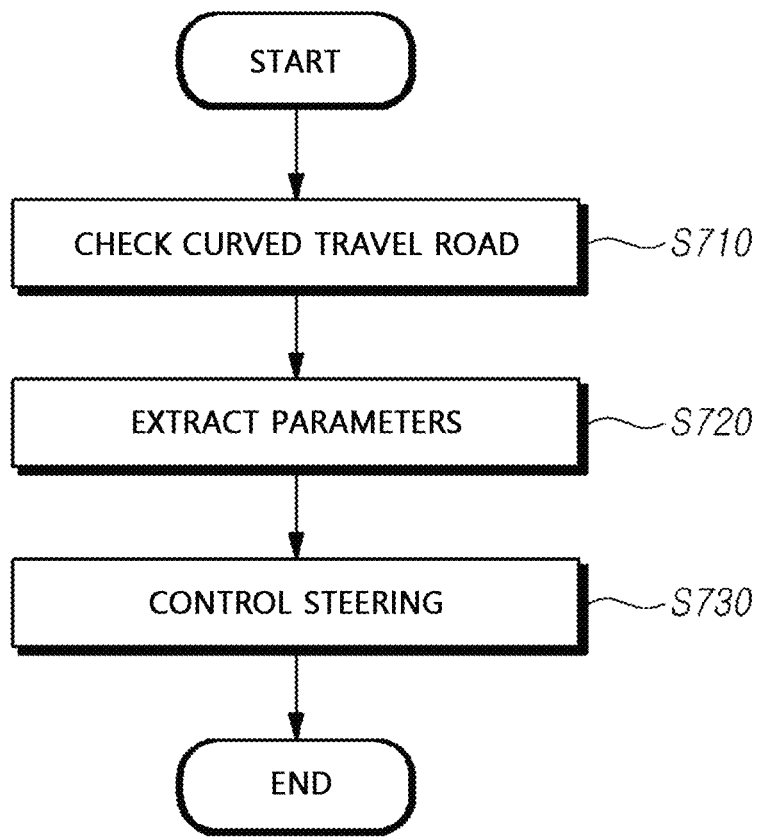
FIG. 21 is a flowchart illustrating the control method of the steering control system according to another embodiment of the present invention.

FIG. 21 is a flowchart illustrating the control method of the steering control system according to another embodiment of the present invention.

Referring to FIG. 21, the control method of the steering control system according to another embodiment of the present invention may include a curved travel road ascertaining operation S710, a parameter extraction operation S720, a steering control operation S730, etc.

The curved travel road ascertaining operation S710 may include ascertaining a curved travel road by using at least one of sensing data and map data.

The parameter extraction operation S720 may include extracting an alternative lateral acceleration parameter Cg replacing a normal lateral acceleration parameter Ng from the map data when the curved travel road is ascertained.

The steering control operation S730 may include generating a target output signal to control the steering of the vehicle 510 on the curved travel road on the basis of the sensing data and the alternative lateral acceleration parameter Cg and outputting the target output signal to the actuator 160.

As described above, according to another embodiment of the present invention, map data set in preparation for a situation where a breakdown may occur in a travel road section may be provided.

Also, according to another embodiment of the present invention, a vehicle may be controlled to more safely travel in preparation for an obstacle or a road surface state that cannot be predicted on a travel road.

A steering control system according to still another embodiment of the present invention will be described below with reference to FIGS. 22 to 29. Here, the steering control system according to still another embodiment of the present invention has an over-the-air (OTA) function for performing an update and an after-sales service on software. To this end, the steering control system according to still another embodiment of the present invention may include an OTA add-on device.

Figure 22:
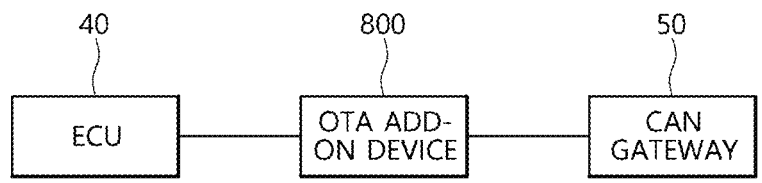
FIG. 22 is a block diagram showing an example of using an over-the-air (OTA) add-on device applied to a steering control system according to still another embodiment of the present invention.
Figure 23:
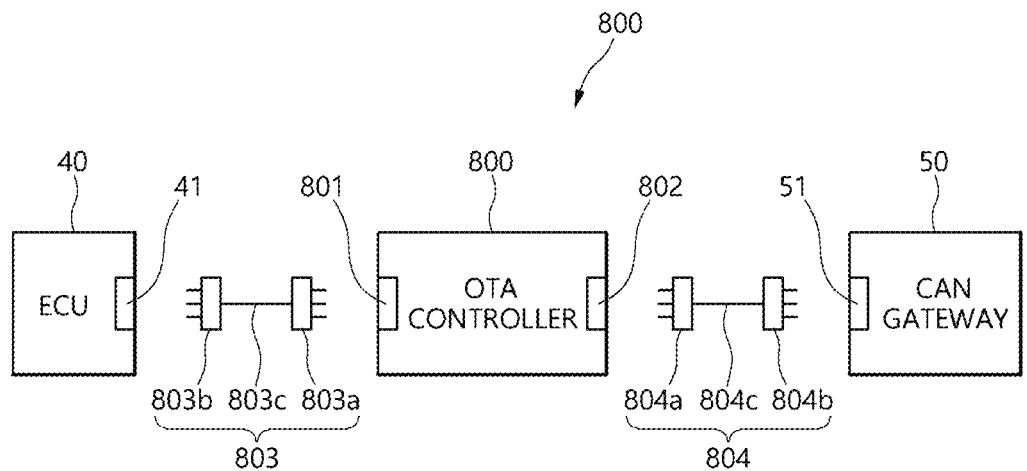
FIG. 23 is a diagram showing an example of connecting an electronic control unit (ECU) or a controller area network (CAN) gateway to the OTA add-on device of FIG. 22.
Figure 24:
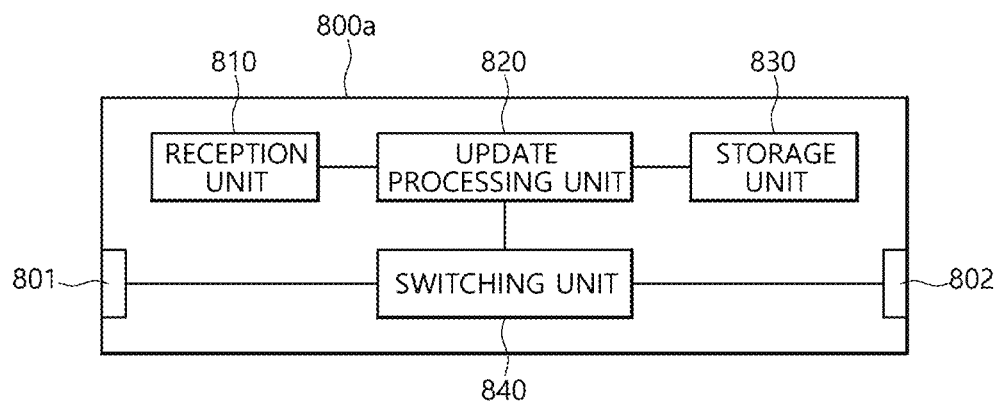
FIG. 24 is a block diagram of an example of the OTA add-on device of FIG. 22.

FIG. 22 is a block diagram showing an example of using an OTA add-on device applied to a steering control system according to still another embodiment of the present invention, FIG. 23 is a diagram showing an example of connecting an ECU or a controller area network (CAN) gateway to the OTA add-on device of FIG. 22, and FIG. 24 is a block diagram of an example of the OTA add-on device of FIG. 22.

Referring to FIG. 22, an OTA add-on device 800 applied to the steering control system according to still another embodiment of the present invention may be connected between an ECU 40 and a CAN gateway 50.

Here, the ECU 40 may be a control unit for controlling a variety of sensors and motors related to various functions of the vehicle. As an example, the ECU 40 may be an electric power steering (EPS)-ECU.

That is, the ECU 40 may be understood as being the same as the control unit 20 of FIG. 1. Accordingly, it can be understood that the description of one of the ECU 40 and the control unit 20 of FIG. 1 may also be applied to that of the other one.

The CAN gateway 50 may be connected to each function-specific ECU 40 of the vehicle to perform CAN communication.

The OTA add-on device 800 is for adding the OTA function to a legacy vehicle, and in particular, for wirelessly updating the software of the ECU or delivering available information through the OTA function.

Thus, a software update for legacy ECUs having no OTA function installed therein may be simultaneously performed in bulk in a wireless manner. Accordingly, the software update may be efficiently performed, and thus it is possible to reduce human and physical resources required for the software update.

Referring to FIG. 23, the OTA add-on device 800 includes an OTA controller 800a, a first connection unit 801, and a second connection unit 802. In this case, the OTA controller 800a is connected to the ECU 40 and the CAN gateway 50 through a first cable 803 and a second cable 804.

As an example, the first cable 803 may make a connection between a connector 41 of the ECU 40 and the first connection unit 801 of the OTA controller 800a. Also, the second cable 804 may make a connection between a connector 51 of the CAN gateway 50 and the second connection unit 802 of the OTA controller 800a.

In this case, the first cable 803 may have a pair of connectors 803a and 803b connected to the connector 41 of the ECU 40 and the first connection unit 801 of the OTA controller 800a, respectively. The pair of connectors 803a and 803b may be connected to each other through a signal line 803c.

Also, the second cable 804 may have a pair of connectors 804a and 804b connected to the connector 51 of the CAN gateway 50 and the second connection unit 802 of the OTA controller 800a, respectively. The pair of connectors 804a and 803b may be connected to each other by means of a signal line 804c.

Here, the first connection unit 801 and the second connection unit 802 have been described as being connected to the ECU 40 and the CAN gateway 50 through the first cable 803 and the second cable 804, respectively. However, the first connection unit 801 and the first cable 803 may be integrally provided, and the second connection unit 802 and the second cable 804 may be integrally provided.

Thus, the OTA function may be added without changing the software of the legacy ECU 40. Furthermore, by changing only a portion of chassis and wire harness, the OTA function can be added without changing the ECU 40 and the electrical equipment of the vehicle.

Here, the OTA controller 800*a* is connected to the first connection unit 801 and the second connection unit 802. In this case, the first connection unit 801 and the second connection unit 802 may be integrally formed as the connector of the OTA controller 800*a*.

Also, the OTA controller 800*a* may perform a software update on the ECU 40 in a wireless manner. Also, the OTA controller 800*a* may bypass CAN data between the ECU 40 and the CAN gateway 50 in normal times.

Referring to FIG. 24, the OTA controller 800*a* applied to the steering control system according to still another embodiment of the present invention may include a reception unit 810, an update processing unit 820, a storage unit 830, and a switching unit 840.

The reception unit 810 may receive an update packet for the software update from an update server or an update apparatus in a wireless manner.

The update processing unit 820 may perform a software update on the ECU 40 and perform CAN communication between the ECU 40 and the CAN gateway 50.

That is, when a software update command is received from an external update server or update apparatus, the update processing unit 820 may block the connection between the ECU 40 and the CAN gateway 50 and may perform a software update on the ECU 40.

In this case, the update processing unit 820 may perform a software update on the ECU 40 on the basis of the received update packet.

Here, the update processing unit 820 may check an update environment before the software update in order to ensure the stability of the software update for the ECU 40. That is, the update processing unit 820 may check whether the power of the vehicle is normal or abnormal, whether the security of the update packet is normal or abnormal, and whether the state of the ECU 40 is normal or abnormal.

In more detail, the update processing unit 820 may check whether the voltage provided from the vehicle is stable while performing the software update of the ECU 40. Here, the update processing unit 820 may prohibit the software update for the ECU 40 when the voltage provided from the vehicle is lower than or equal to a specific voltage.

Also, the update processing unit 820 may check the security state of the update packet. Here, the update processing unit 820 may check the security of the update packet for the software update for the ECU 40. In this case, the update processing unit 820 may have a cyber security function. Here, the update processing unit 820 may operate in a data handshake manner.

Also, the update processing unit 820 may check the state of the ECU 40. Here, the update processing unit 820 may diagnose whether the state of the ECU 40 is normal through communication with the ECU 40.

In this case, the update processing unit 820 may perform a software update on the ECU 40 only when it is determined that the update environment is normal.

Also, the update processing unit 820 may make a connection between the ECU 40 and the CAN gateway 50 to bypass the CAN data in normal times. That is, when the software update command is not received from the external update server or update apparatus, the update processing unit 820 only bypasses the CAN data without performing the OTA function. In this case, the ECU 40 and the CAN gateway 50 are electrically connected to each other, and thus the CAN communication may be normally performed.

The storage unit 830 stores update packets. In this case, until all the update packets are received, the update processing unit 820 may not initiate the update and may store the received update packets in the storage unit 830. That is, the update processing unit 820 may initiate the software update on the ECU 40 after all of the update packets are received.

Thus, even when the reception of the update packets is stopped due to deterioration of wireless communication while the update packets are received from the external update server or update apparatus, the update processing unit 820 may receive the following update packet.

That is, when the reception of the update packets is stopped while the update packets are being received, the update processing unit 820 may receive the following update packet, instead of receiving the initial update packet again. Accordingly, it is possible to improve efficiency of receiving update packets.

The switching unit 840 may selectively make or block a connection between the ECU 40 and the CAN gateway 50. That is, the switching unit 840 may make a connection between the ECU 40 and the CAN gateway 50 under the control of the update processing unit 820 in normal times.

Also, the switching unit 840 may block the connection between the ECU 40 and the CAN gateway 50 not to interfere with an update of the ECU 40 under the control of the update processing unit 820 upon a software update of the ECU 40.

The operation of the OTA add-on device 800 will be described with reference to FIGS. 25 and 26.

Figure 25:
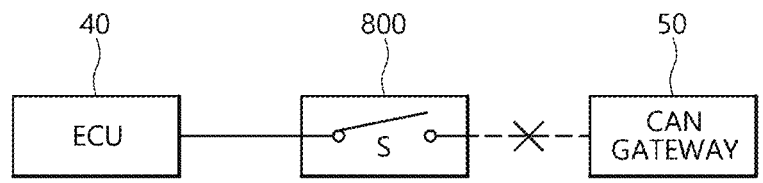
FIG. 25 is a diagram showing a connection state between the ECU and the CAN gateway upon software update for the ECU in FIG. 23.

FIG. 25 is a diagram showing a connection state between the ECU and the CAN gateway upon a software update of the ECU in FIG. 23.

The OTA add-on device 800 waits to receive a software update command from the external update server or update apparatus.

In this case, when the reception unit 810 receives the software update command, the update processing unit 820 receives update packets and stores the received update packets in the storage unit 830. Here, the update processing unit 820 may wait without performing a software update on the ECU 40 until all of the update packets are received and stored in the storage unit 830.

When all of the update packets are received, the update processing unit 820 checks a software update environment. In this case, the update processing unit 820 may check the voltage state of the vehicle, the security state of the update packet, the operation state of the ECU 40, etc.

When it is determined that the software update environment is normal, the update processing unit 820 may control the switching unit 840 to block the connection between the ECU 40 and the CAN gateway 50.

While the connection between the ECU 40 and the CAN gateway 50 is blocked as described above, the update processing unit 820 may perform a software update on the ECU 40 on the basis of the update packets stored in the storage unit 830.

Figure 26:
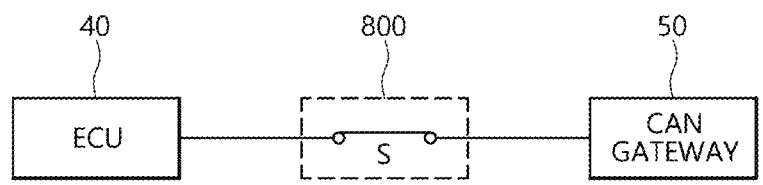
FIG. 26 is a diagram showing a connection state between the ECU and the CAN gateway in normal times in FIG. 23.

FIG. 26 is a diagram showing a connection state between the ECU and the CAN gateway in normal times in FIG. 23.

When the software update command is not received, the OTA add-on device 800 may perform a normal mode. In this case, the update processing unit 820 may control the switching unit 840 such that the ECU 40 and the CAN gateway 50 are connected to each other.

While the connection between the ECU 40 and the CAN gateway 50 is made as described above, the update processing unit 820 may bypass the CAN data between the ECU 40 and the CAN gateway 50.

Meanwhile, the OTA add-on device of the present invention may be connected to an on-board diagnostics (OBD) module.

Figure 27:
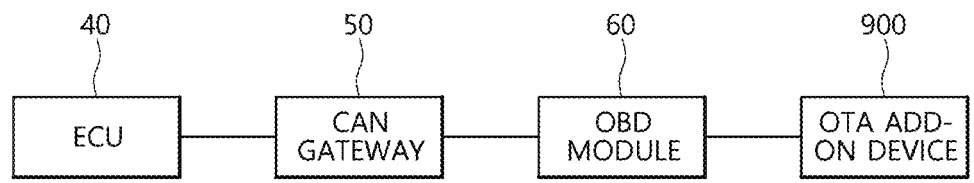
FIG. 27 is a block diagram showing another example of using the OTA add-on device applied to a steering control system according to yet another embodiment of the present invention.
Figure 28:
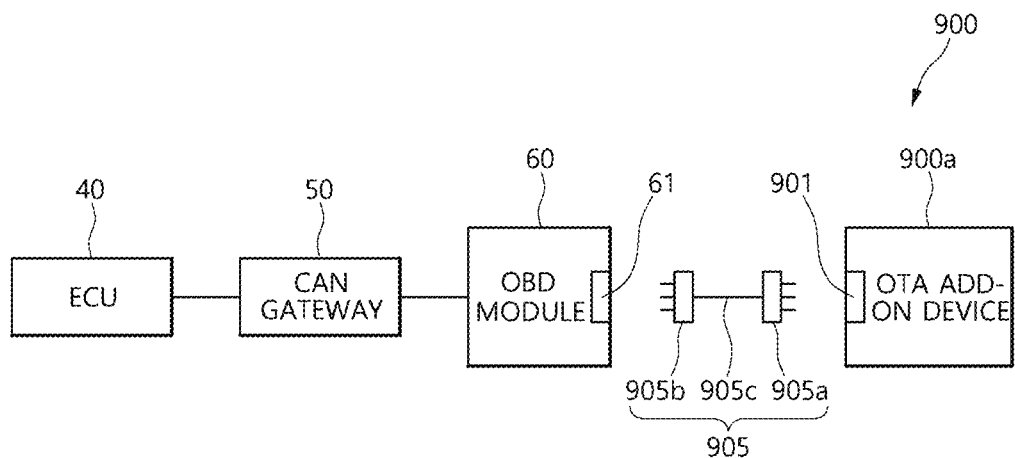
FIG. 28 is a diagram showing an example of connecting an on-board diagnostics (OBD) module to the OTA add-on device in FIG. 27.
Figure 29:
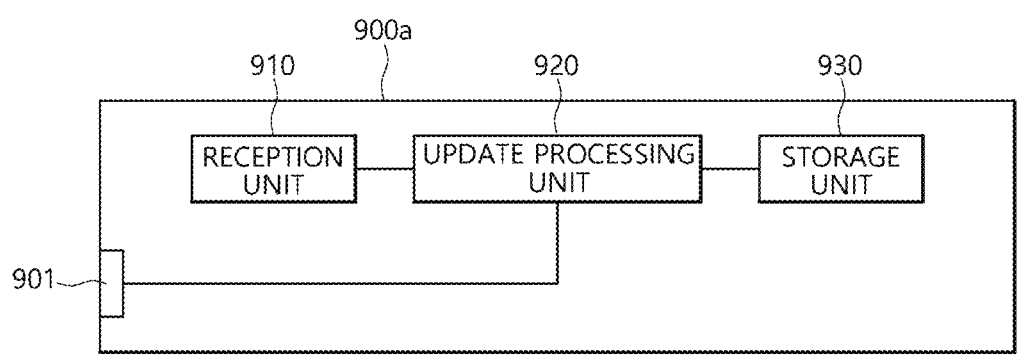
FIG. 29 is a block diagram of another example of the OTA add-on device of FIG. 27.

FIG. 27 is a block diagram showing another example of using the OTA add-on device applied to a steering control system according to yet another embodiment of the present invention, FIG. 28 is a diagram showing an example of connecting an OBD module to the OTA add-on device in FIG. 27, and FIG. 29 is a block diagram of another example of the OTA add-on device of FIG. 27.

Referring to FIG. 27, the CAN gateway 50 may be connected to each function-specific ECU 40 of the vehicle to perform CAN communication.

An OBD module 60 is for connecting the CAN gateway 50 to an external device. Also, the OBD module 60 may perform CAN communication with the ECU 40 through the CAN gateway 50.

Referring to FIG. 28, an OTA add-on device 900 includes an OTA controller 900*a* and a first connection unit 901. In this case, the OTA controller 900*a* is connected to the OBD module 60 through a first cable 905.

As an example, the first cable 905 may be connected to a connector 61 of the OBD module 60 of the vehicle of the ECU 40.

In this case, the first cable 905 may have a pair of connectors 905*a* and 905*b* connected to the connector 61 of the OBD module 60 and the first connection unit 901 of the OTA controller 900*a*, respectively. The pair of connectors 905*a* and 905*b* may be connected to each other by means of a signal line 905*c*.

Here, the first connection unit 901 has been shown and described as being connected to the OBD module 60 through the first cable 905. However, the first connection unit 901 and the first cable 905 may be integrally provided.

Thus, the OTA function may be added without changing the structure of the vehicle as well as changing the software of the legacy ECU.

Here, the OTA controller 900*a* is connected to the first connection unit 901. In this case, the first connection unit 901 may be formed integrally as the connector of the OTA controller 900*a*.

Also, the OTA controller 900*a* may perform a software update on the ECU 40 in a wireless manner.

Referring to FIG. 29, the OTA controller 900*a* applied to the steering control system according to yet another embodiment of the present invention may include a reception unit 910, an update processing unit 920, and a storage unit 930. Here, the OTA controller 900*a* has a configuration similar to that of the OTA controller 800*a*, and thus a description of the same elements will be omitted.

The reception unit 910 may receive update packets for a software update from an update server or an update apparatus in a wireless manner.

Similarly to the update processing unit 820, the update processing unit 920 may perform a software update on the ECU 40.

That is, when a software update command is received from an external update server or update apparatus, the update processing unit 920 may perform a software update on the ECU 40 through the OBD module 60 and the CAN gateway 50.

The storage unit 930 stores update packets similarly to the storage unit 830.

The operation of the OTA add-on device 900 will be described below. First, the OTA add-on device 900 waits to receive a software update command from an external update server or update apparatus.

In this case, when the reception unit 910 receives the software update command, the update processing unit 920 receives update packets and stores the received update packets in the storage unit 930. When all of the update packets are received, the update processing unit 920 checks a software update environment.

When it is determined that the software update environment is normal, the update processing unit 920 may perform a software update on the ECU 40 through the OBD module 60 and the CAN gateway 50 on the basis of the update packets stored in the storage unit 930.

With such a configuration, according to yet another embodiment of the present invention, it is possible to efficiently perform a software update for legacy ECUs, add the OTA function without changing the software of legacy ECUs, and add the OTA function without changing the structure of a vehicle as well as changing the software of legacy ECUs.

The steering control system configured as described above and the control method thereof according to an embodiment of the present invention can prevent dangerous situations that may arise due to erroneous steering control by determining whether a steering sensor is affected by a disturbance and then performing control.

Also, according to the present invention, it is possible to provide map data set in preparation for a situation where a breakdown may occur in a travel road section.

Also, according to the present invention, it is possible to control a vehicle to more safely travel in preparation for an obstacle or a road surface state that cannot be predicted on a travel road.

Also, according to the present invention, by adding an OTA function to a legacy ECU, it is possible to efficiently perform a software update on the legacy ECU.

Also, according to the present invention, by adding an OTA function to make a connection between a legacy ECU and a CAN gateway of a vehicle, it is possible to add the OTA function without changing the software of the legacy ECU.

Also, according to the present invention, by adding an OTA function to make a connection to an OBD module connected to a legacy ECU, it is possible to add an OTA function without changing the structure of a vehicle as well as changing the software of the legacy ECU.

While the present invention has been described with reference to exemplary embodiments, it will be appreciated that various changes and modifications may be made without departing from the scope of the present invention. Thus, the scope of the present invention shall not be restricted or limited by the foregoing embodiments, but is to be determined by the following claims and their equivalents.

What is claimed is:

1. A steering control system comprising:
 a control unit configured to perform steering control using a steering torque and a steering angle detected by a steering torque sensor and a steering angle sensor of a vehicle and determine whether the steering torque and/or the steering angle is changed by a disturbance, wherein the control unit is configured to, when it is determined that a currently detected steering torque and/or steering angle is changed by the disturbance, perform current steering control based on a previously detected steering torque and/or steering angle, which was previously detected by the steering torque and/or the steering angle while there was no disturbance, without using the currently detected steering torque and/or steering angle, which is currently detected by the steering torque and/or the steering angle, for performing the current steering control.

2. The steering control system of claim 1, wherein when only one of the steering torque and the steering angle is changed, the control unit determines that the change is made by a disturbance.

3. The steering control system of claim 1, wherein when directions of change of the steering torque and the steering angle are inconsistent with a predetermined reference direction, the control unit determines that the change of the steering torque and the steering angle is made by a disturbance.

4. The steering control system of claim 1, wherein when a rate of change of the steering angle is not constant, the control unit determines that the change of the steering angle is made by a disturbance.

5. The steering control system of claim 1, wherein when a number of times it is determined that the change of the steering torque or the steering angle is made by a disturbance exceeds a predetermined reference number, the control unit performs control such that an error notification is output.

6. The steering control system of claim 1, wherein,
the vehicle has an autonomous driving system, and
the control unit performs control such that steering assistance is provided according to the autonomous driving system when the steering torque and the steering angle are changed such that directions of change of the steering torque and the steering angle are consistent with a predetermined reference direction and a rate of change of the steering angle is constant while a driver does not grip a steering wheel.

7. The steering control system of claim 1, wherein,
the vehicle has an autonomous driving system, and
when the steering torque and the steering angle are changed such that directions of change of the steering torque and the steering angle are consistent with a predetermined reference direction and a rate of change of the steering angle is constant while a driver grips a steering wheel, the control unit performs control such that steering assistance is provided according to the driver's driving operation when the vehicle is in a non-dangerous area and performs control such that steering assistance is provided according to the autonomous driving system when the vehicle is in a dangerous area.

8. The steering control system of claim 1, wherein,
the vehicle has an autonomous driving system, and
the control unit is configured to:
ascertain a curved travel road using at least one of sensing data and map data;
extract an alternative lateral acceleration parameter replacing a normal lateral acceleration parameter from the map data when the curved travel road is ascertained; and
generate a target output signal and output the generated target output signal to an actuator so that the steering of the vehicle on the curved travel road is controlled on the basis of the sensing data and the alternative lateral acceleration parameter.

9. The steering control system of claim 1, wherein,
the vehicle has an autonomous driving system, and
the steering control system further comprises a map data setting device configured to:

predict whether the vehicle deviates from a normal travel route on a travel road by comparing an abnormal lateral acceleration parameter estimated when the state of the vehicle is abnormal to a normal lateral acceleration parameter corresponding to when the state of the vehicle is normal;
predict whether the vehicle deviates from the travel road when it is predicted that the vehicle deviates from the normal travel route and configured to calculate an alternative lateral acceleration parameter replacing the normal lateral acceleration parameter of the travel road when it is predicted that the vehicle deviates from the travel road; and
update prestored map data by applying the alternative lateral acceleration parameter to the map data.

10. The steering control system of claim 1, further comprising an over-the-air (OTA) controller connected to a controller area network (CAN) gateway of the vehicle and the control unit and configured to perform a software update on the control unit in a wireless manner and bypass CAN data between the control unit and the CAN gateway.

11. The steering control system of claim 1, further comprising an OTA controller connected to an on-board diagnostics (OBD) module of the vehicle which performs CAN communication with the control unit through a CAN gateway of the vehicle and configured to perform a software update on the control unit in a wireless manner.

12. The steering control system of claim 1, wherein the control unit is configured to, when it is determined that the currently detected steering torque and/or steering angle is changed by the disturbance, use a latest steering torque and/or steering angle, which was previously detected while there was no disturbance, as the current steering torque and/or steering angle to perform the steering control by maintaining previously performed steering control, which was previously performed by the control unit while there was no disturbance, without using the currently detected steering torque and/or steering angle.

13. A control method of a steering control system, the control method comprising:
detecting a steering torque and a steering angle of a vehicle;
determining whether the steering torque and/or the steering angle is changed by a disturbance; and
when it is determined that a currently detected steering torque and/or steering angle is changed by the disturbance, performing current steering control based on a previously detected steering torque and/or steering angle, which was previously detected by the steering torque and/or the steering angle while there was no disturbance, without using the currently detected steering torque and/or steering angle, which is currently detected by the steering torque and/or the steering angle, for performing the current steering control.

14. The control method of claim 13, wherein the performing of the steering control comprises:
determining that the change of the steering torque is made by a disturbance when any one of the steering torque and the steering angle is changed and the other is not changed;
determining that the change of the steering torque and the steering angle is made by a disturbance when directions of change of the steering torque and the steering angle are inconsistent with a predetermined reference direction; and determining that the change of the steering angle is made by a disturbance when a rate of change of the steering angle is not constant.

15. The control method of claim 13, wherein the performing of the steering control comprises performing control such that an error notification is output when a number of times it is determined that the change of the steering torque or the steering angle is made by a disturbance exceeds a predetermined reference number.

16. The control method of claim 13, wherein,
the vehicle has an autonomous driving system, and
the performing of the steering control comprises:
   performing control such that steering assistance is provided by the autonomous driving system on assumption that the steering torque and the steering angle are changed such that directions of change of the steering torque and the steering angle are consistent with a predetermined reference direction and a rate of change of the steering angle is constant while a driver does not grip a steering wheel; and
   performing control such that steering assistance is provided according to a driving operation of the driver when the vehicle is located in a non-dangerous area and performing control such that steering assistance is provided by the autonomous driving system when the vehicle is located in a dangerous area on the assumption that the steering torque and the steering angle are changed such that the directions of change of the steering torque and the steering angle are consistent with the predetermined reference direction and the rate of change of the steering angle is constant while the driver grips the steering wheel.

17. The control method of claim 13, wherein,
the vehicle has an autonomous driving system, and
the performing of the steering control comprises:
   ascertaining a curved travel road using at least one of sensing data and map data;
   extracting an alternative lateral acceleration parameter replacing a normal lateral acceleration parameter from the map data when the curved travel road is ascertained; and
   generating a target output signal and outputting the generated target output signal to an actuator so that the steering of the vehicle on the curved travel road is controlled on the basis of the sensing data and the alternative lateral acceleration parameter.

18. The control method of claim 13, wherein,
the vehicle has an autonomous driving system, and
the performing of the steering control further comprises:
   predicting whether the vehicle deviates from a normal travel route on a travel road by comparing an abnormal lateral acceleration parameter estimated when the state of the vehicle is abnormal to a normal lateral acceleration parameter corresponding to when the state of the vehicle is normal;
   predicting whether the vehicle deviates from the travel road when it is predicted that the vehicle deviates from the normal travel route and calculating an alternative lateral acceleration parameter replacing the normal lateral acceleration parameter of the travel road when it is predicted that the vehicle deviates from the travel road; and
   updating prestored map data by applying the alternative lateral acceleration parameter to the map data.

* * * * *